United States Patent [19]

Tsuruoka et al.

[11] Patent Number: 4,995,332

[45] Date of Patent: Feb. 26, 1991

[54] APPARATUS FOR STOCKING GOLF CLUBS

[75] Inventors: Shigeyoshi Tsuruoka; Saigiro Hayashi, both of Chiba, Japan

[73] Assignee: Hoyu Bussan Kabushiki Kaisha, Chiba, Japan

[21] Appl. No.: 362,683

[22] Filed: Jun. 7, 1989

Related U.S. Application Data

[63] Continuation-in-part of Ser. No. 316,225, Feb. 27, 1989, abandoned.

[51] Int. Cl.[5] ...................... B05B 15/12; A63B 57/00; A46B 13/04; B65G 29/00

[52] U.S. Cl. .................................... 118/66; 15/21 D; 15/88; 15/319; 15/320; 118/73; 118/695; 118/696; 198/478.1; 198/803.14; 198/855; 206/315.2; 206/315.7

[58] Field of Search ................ 198/803.14, 478.1, 859; 15/21 D, 88, 77, 319, 320, 306 R; 118/66, 72, 73, 695, 696, 704; 206/315.5, 315.6, 315.7, 315.2

[56] References Cited

U.S. PATENT DOCUMENTS

| | | | |
|---|---|---|---|
| 2,760,620 | 8/1956 | Hull et al. | 198/478.1 |
| 3,255,861 | 6/1966 | Fritz | 198/859 |
| 3,908,585 | 9/1975 | Griffin et al. | 110/73 |
| 4,192,079 | 3/1980 | Brookhsyer et al. | 198/859 |
| 4,380,839 | 4/1983 | Caradonna | 15/21 B |
| 4,589,467 | 5/1986 | Hunter | 198/478.1 |
| 4,750,230 | 6/1988 | Osborn | 15/21 D |
| 4,753,446 | 6/1988 | Mille | 206/315.6 |
| 4,832,590 | 5/1989 | Bellmer | 425/185 |

FOREIGN PATENT DOCUMENTS

| | | | |
|---|---|---|---|
| 829498 | 5/1981 | U.S.S.R. | 198/859 |

*Primary Examiner*—Jay H. Woo
*Assistant Examiner*—K. P. Nguyen
*Attorney, Agent, or Firm*—Bachman & LaPointe

[57] ABSTRACT

An apparatus for stocking a plurality of golf clubs which have been cleaned and waxed is disclosed in which a turn table supporting member, a turn table rotatably supported on the turn table supporting member, and a plurality of golf club housings attached to the turn table in a radial direction of the turn table with equal angles to each other with respect to the turn table for housing the respective golf clubs derived from a club output port of a golf club cleaning and waxing equipment, and a turn table drive mechanism for turning the turn table so that one of club introducing inlets provided on the respective housings is sequentially communicated with the club output port. The associated golf club cleaning and waxing equipment includes an equipment housing having a golf club inserting inlet and golf club output port, both golf club inserting inlet and output port being located on a peripheral surface of the equipment housing, a golf club transport mechanism for transporting the golf club inserted into the equipment housing through the golf club inserting inlet toward the output port, a golf club cleaning portion, a golf club waxing portion, and a golf club grip drying portion, the golf club is sequentially transported on the transport mechanism passing through each portion thereof.

22 Claims, 20 Drawing Sheets

APPARATUS FOR STOCKING GOLF CLUBS

CROSS-REFERENCE

This is a continuation-in-part application based on a patent application Ser. No. 316,225 filed on Feb. 27, 1989 now abandoned.

BACKGROUND OF THE INVENTION (1) Field of the Invention

The present invention relates to a structure of an apparatus for stocking golf clubs which temporarily stocks the golf clubs appearing on an output port for the golf clubs installed on an equipment for cleaning and finishing (waxing) the golf clubs after the cleaning and waxing operations for each of the golf clubs have been carried out in the golf club cleaning and waxing equipment.

(2) Background of the Art

Golf clubs used for playing golf at golf fields and/or golf practice ranges have usually become dirty due to soil and/or dust. If the dirty golf clubs are left unhandled without cleaning, the soil and/or dust become stuck to surfaces of the golf clubs and rust is generated on shaft and head portions.

Therefore, it is desirable to clean and/or wax the golf clubs.

However, since it is tiresome to clean and/or wax the golf clubs manually at the golf fields, etc., there is a strong demand for developing automatic cleaning and waxing equipment for golf clubs and for temporarily stocking the cleaned and waxed golf clubs.

To meet such a demand, a golf club cleaning and waxing equipment 6 has been developed, as shown in FIG. 9. In FIG. 9, one of the golf clubs which becomes dirty 1 is inserted into a housing 3 via a club inserting inlet 2. The golf club 1 is transported to a club cleaning portion in the housing 3 by means of a club transport mechanism 4. When the golf club 1 is cleaned in the cleaning portion of the golf club cleaning and waxing equipment, it is cleaned and transported to a club waxing portion to wax (polish) the club 1. Thereafter, the club 1 is outputted via a club output port 5.

However, since, in the above-described golf club cleaning and waxing equipment 6, each golf club is taken out via the club output port 5 after the cleaning and waxing of each golf club, there has been no consideration for handling each golf club transported via the output port 5. Therefore, it is necessary to manually receive each golf club transported via the output port 5.

In addition, in a case where the plurality of golf clubs owned and used by a plurality of golf players are sequentially inputted to the club inserting inlet 2, it becomes troublesome to distribute and hand over the outputted golf clubs to the plurality of golf players.

SUMMARY OF THE INVENTION

It is therefore an object of the present invention to provide an apparatus for stocking golf clubs which can temporarily stock golf clubs transported from a club output port of a golf club cleaning and waxing equipment with the golf clubs classified according to users.

The above-described object can be achieved by providing an apparatus for stocking a plurality of golf clubs, comprising: (a) a turn table supporting member; (b) a turn table rotatably supported on the turn table supporting member; (c) a plurality of golf club housings, each having a club introducing inlet, attached to the turn table in radial directions of the turn table with equal angles of intervals with respect to the turn table for housing respective golf clubs derived from a club output port of a golf club cleaning and waxing equipment; and (d) a turn table drive mechanism for turning the turn table so that any one of the golf club introducing inlets is communicated with the club output port of the club cleaning and waxing equipment to receive one of the golf clubs derived through the output port.

The above-described object can also be achieved by providing an apparatus, comprising: (a) a base table member; (b) a plurality of elongated housings extended from the base table member, each having a bottom portion attached onto the base table member and defining a space for entering and suspending an elongated rod thereinto; and (c) means for driving the base table member to rotate through each predetermined angle so that the space defined by each elongated housing is aligned with the elongated rod present at an outside of the apparatus.

The above-described object can also be achieved by providing an apparatus, comprising: (a) a base table member; (b) a plurality of elongated housings extended from the base table member, each having a bottom portion attached onto the base table member and defining a space for entering and suspending an elongated rod thereinto; and (c) means for driving the base table member to rotate through a predetermined angle in synchronization with an operation of a golf club cleaning and waxing equipment so that the space defined by each elongated housing is aligned with an output port of the cleaning and waxing equipment at which the elongated rod is present.

BRIEF DESCRIPTION OF THE DRAWINGS

FIG. 10 (B) is an electrical connection diagram of a control unit of the golf club cleaning and waxing equipment shown in FIG. 9.

DETAILED DESCRIPTION OF THE PREFERRED EMBODIMENT

Figure 1:
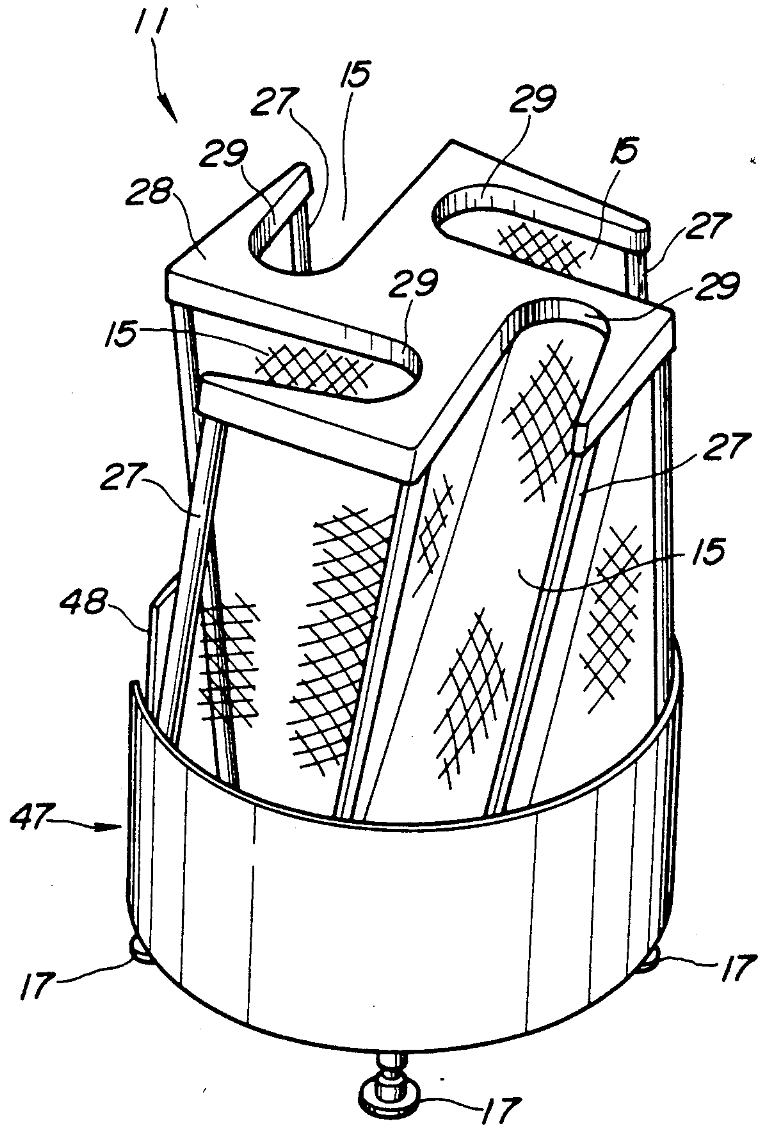
FIG. 1 is a perspective view of a golf club stocking apparatus in a preferred embodiment according to the present invention.

Reference will hereinafter be made to the drawings in order to facilitate understanding of the present invention.

FIGS. 1 to 8 show a golf club stocking apparatus according to the present invention.

A golf club stocking apparatus 11 includes: (a) a turn table supporting body 12 (refer to FIG. 3); (b) a turn table 13 (refer to FIG. 3) rotatably supported by the turn table supporting body 12, (c) four golf club housing 15, ---, 15, attached radially to the turn table with equal angles with respect to each other and having golf club inlets 14, for introducing and housing a golf club 1 transported from a golf club cleaning and waxing equipment 6 via a club output port 5 (refer to FIG. 9) and via each club inlet 14; and (d) a turn table drive mechanism 16 (refer to FIG. 3) which operatively turn the turn table 13 so that one of the club inlets 14 of the golf club housings 15, ---, 15 is communicated with the club output port 5 of the golf club cleaning and waxing equipment 6.

The above-described turn table supporting body 12 is formed in a disk shape of metal and is horizontally disposed on a floor 18 via four legs 17, ---, 17 attached on a peripheral edge portion of the turn table supporting body 12.

Figure 4:
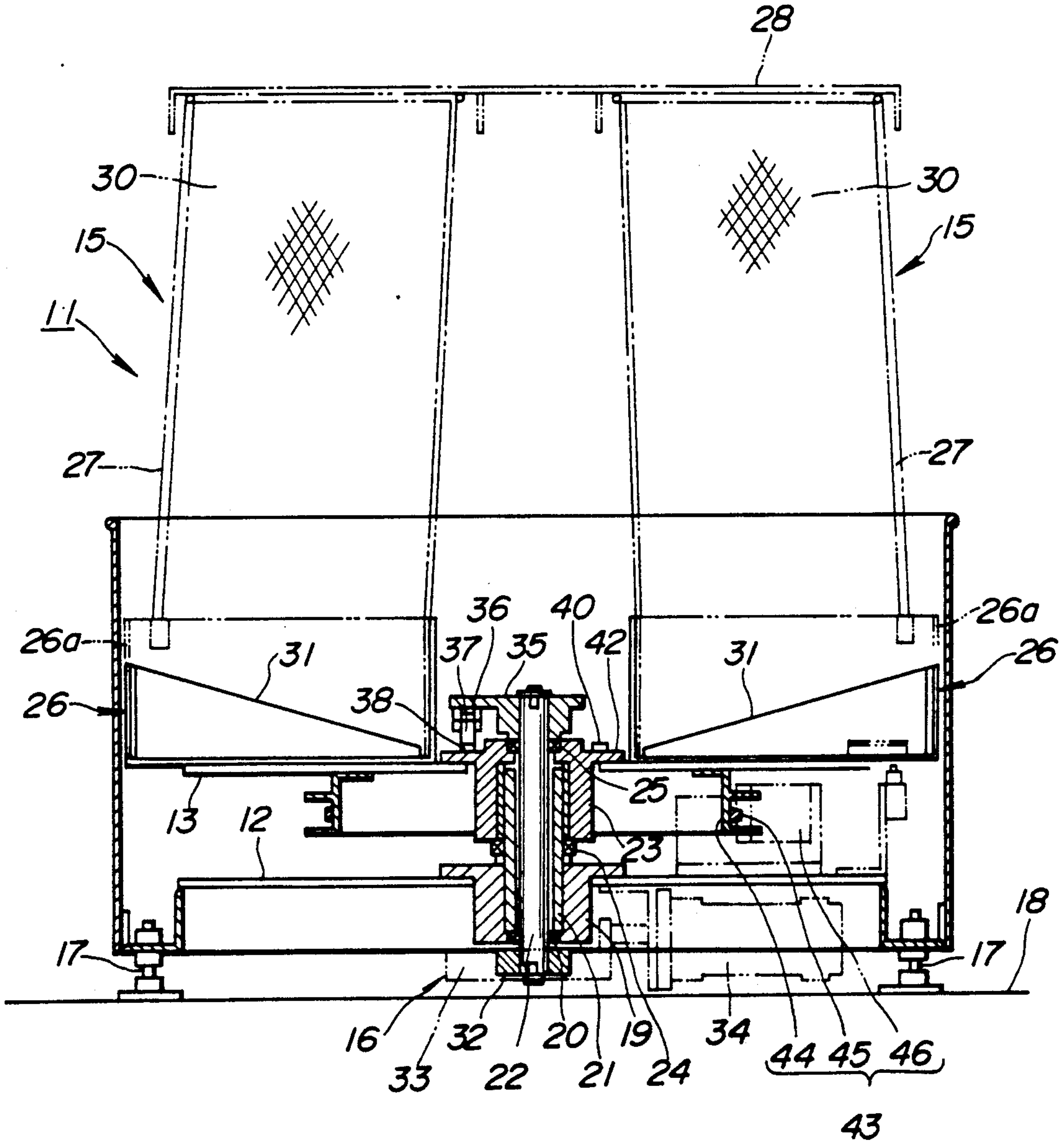
FIG. 4 is a cross sectional view of an essential part of the golf club stocking apparatus.

As shown in FIG. 4, a center portion of the turn table supporting body 13 is provided with a radial bearing 20 and bush 21 via a bearing member 19.

A turn table supporting axle 22 is rotatably attached to the radial bearing 20 and bush 21 in the vertical direction.

The turn table 13 is formed in a disc shape of metal. A center portion thereof is provided with a supporting axle bearing portion 23 into which the turn table supporting axle 22 is fitted at its outer periphery. A lower end of the supporting axle bearing portion 23 is mounted on a bearing 24 attached about an outer periphery of the bush 21. In addition, a bearing 25 attached on an upper portion of the supporting axle bearing portion 23 is fitted to the turn table supporting axle 22. Thus, the turn table 23 is supported on the supporting body 12 so as to enable rotation with the turn table supporting axle 22 as a center.

The four golf club housings 15, ---, 15 includes: (a) four circular buckets 26, ---, 26 disposed on the turn table 13 with each interval of approximately 90; (b) four ceiling supporting poles 27, ---, 27 extended obliquely from a peripheral edge of the turn table 13 with substantially equal distances to each other; (c) a substantially hooked cross shaped ceiling 28 supported on an upper portion of the circular buckets 26, ---, 26 by means of the ceiling supporting poles 27, ---, 27; and (d) nets 30, ---, 30, each having arc shape in plane, extended from an internal peripheral edge of each recess 29, ---, 29 of the ceiling 28 to a peripheral edge of the circular buckets 26, ---, 26. Since no net is extended at an open end of the recesses 29, ---, 29 of the ceiling 28 and a cut out portion *26a* at a peripheral edge of the circular buckets 26, ---, 26 located at an outer periphery of the turn table, a part at which no net is extended provides each club introducing inlet 14.

As typically shown in FIG. 4, a bottom surface 31 of each circular bucket 26, ---, 26 is formed as an inclined surface having a descending gradient toward an inside of the turn table 13 so that the golf club 1 transported to each club introducing inlet 14 can slidably be forwarded to a depth direction of each golf club housing 15. With positions of the circular buckets 26 and recesses 29 of the ceiling 28 offset to each other so that the club housings 15, ---, 15 are inclined through predetermined angles, the golf clubs 1, ---, 1 introduced into the respective golf club housings 15, ---, 15 are stably tilted and held through the predetermined angles.

Figure 5:
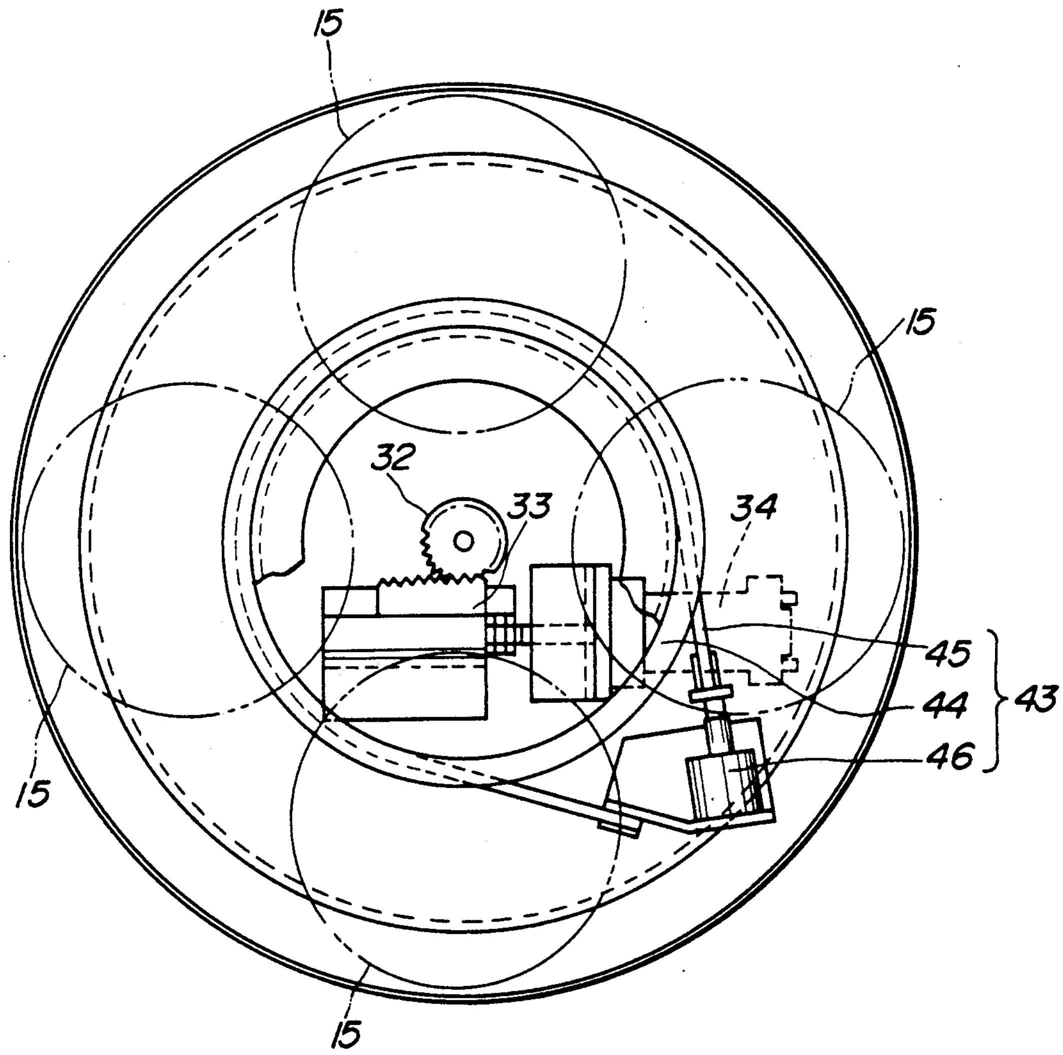
FIG. 5 is a plan view of a pinion and rack portion in a turn table drive mechanism of the golf club stocking apparatus shown in FIGS. 1 to 4.
Figure 6:
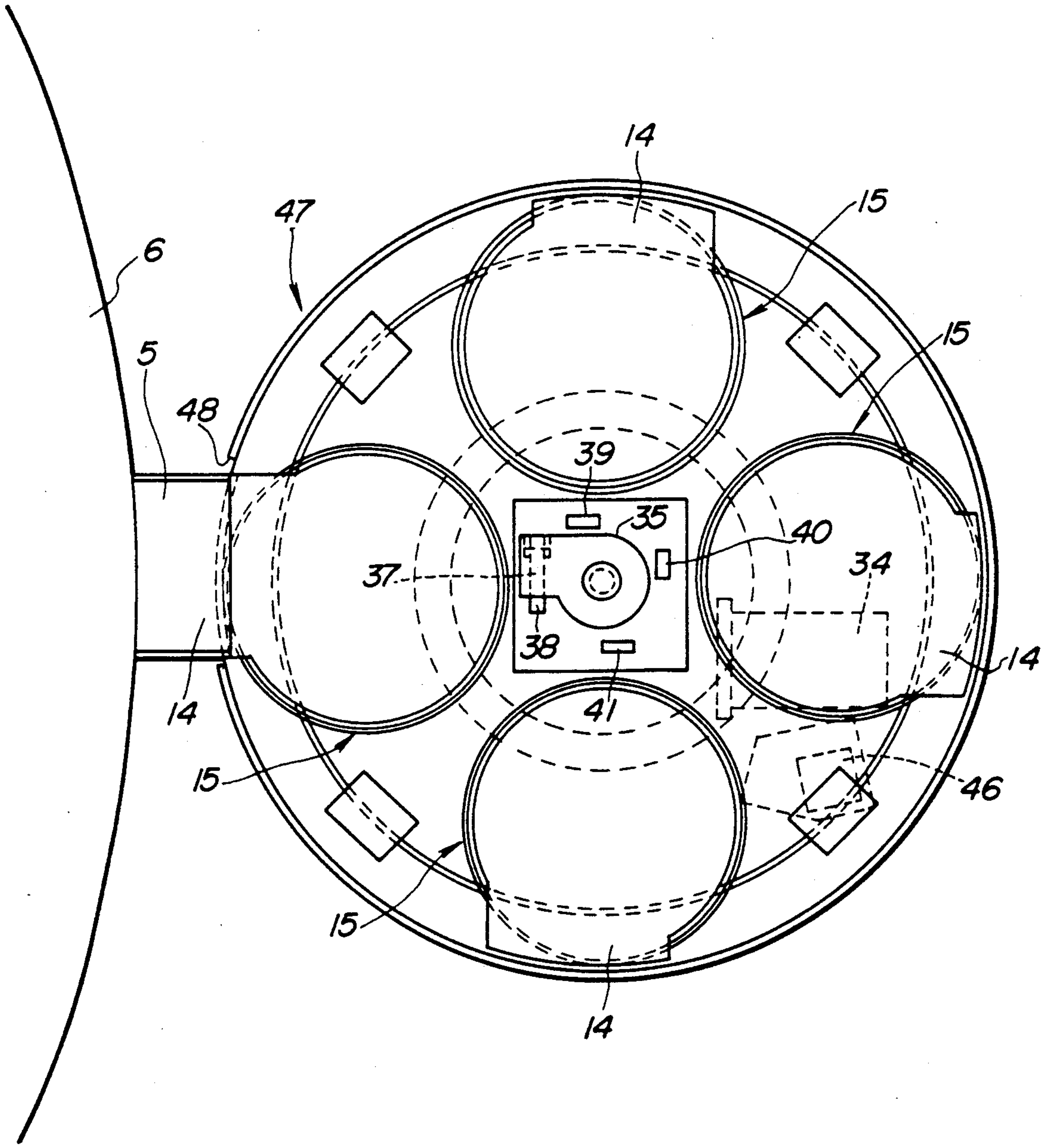
FIG. 6 is a plan view of an engagement portion of pawls in the turn table drive mechanism shown in FIG. 5.
Figure 7:
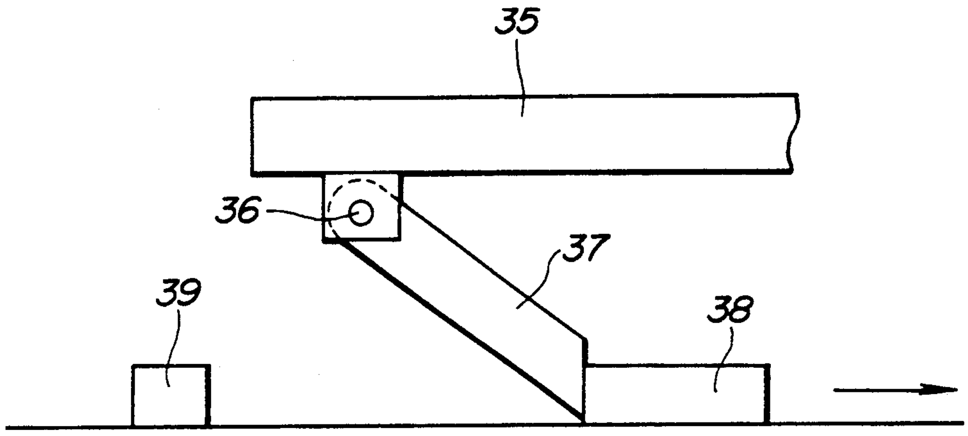
FIG. 7 is a side view of the engagement portion for explaining an operation of the turn table drive mechanism.
Figure 8:
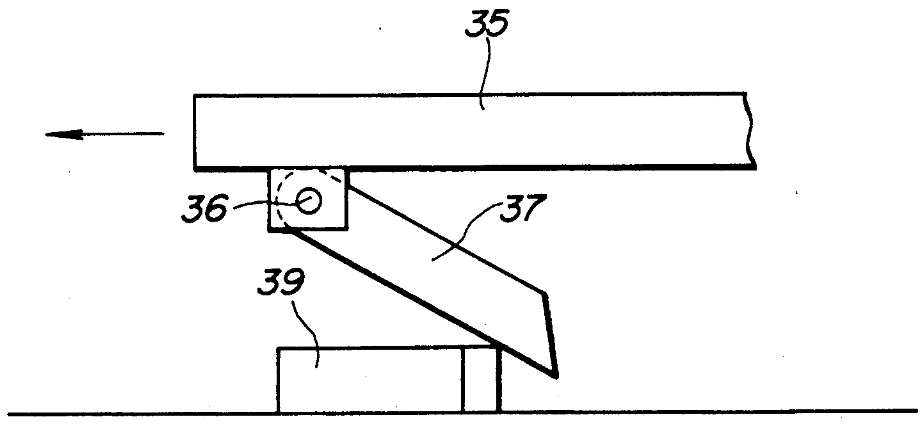
FIG. 8 is a side view of the engagement portion for explaining the operation of the turn table drive mechanism.

The turn table drive mechanism 16, as typically shown in FIGS. 4 and 5, includes a pinion 32 fixedly installed on a lower end portion of a turn table supporting axle 22, a rack 33 meshed with the pinion 32, an air cylinder 34 for sliding the rack 33, a pawl supporting plate 35 fixed on an upper end of the turn table supporting axle 22, a pawl 37 rotatably attached to the pawl supporting plate 35 via an axle 36, and four pawl engagement projections 38, 39, 40, and 41 attached to the supporting axle bearing portion 23 so as to enable engagement to a tip of the pawl 37. The four pawl engagement projections 38, ---, 41 are formed, as shown in FIG. 6, on an upper surface of a flange portion 42 integrally formed on the supporting axle bearing portion 23 so as to oppose the club housings 15, ---, 15. One end of each pawl engagement 38, ---, 41 is brought in contact with the tip of the pawl 37.

When the rack 33 is pressed toward a forward direction by means of the air cylinder 34, the pinion 32 meshed with the rack 33 causes the turn table supporting axle 22 and pawl supporting plate 35 to rotate in the counterclockwise direction through 90°. Then, the pawl 37 attached onto the pawl supporting plate 35 presses against one of the pawl engagement projections 38 positioned at the club output port 5 of the cleaning and waxing equipment 6, shown in FIGS. 9 through 22, to turn the turn table 13 in the counterclockwise direction through 90°. Therefore, the club introducing inlet 14 of one of the golf club housings 15 which is adjacent in the counterclockwise direction to one of the club housings 15 which has been located at the club output port 5 of the club cleaning and waxing equipment 6 is pivoted toward the position of the club output port 5.

At this time, the other pawl engagement projection 39 adjacent in the clockwise direction to the pawl engagement projection 38 is pivoted to the position of the club output port 5.

In addition, when the air cylinder 34 is activated to reciprocate (pull) the rack 33 in the rearward direction, the pinion 32 causes the turn table supporting axle 22 and pawl supporting plate 35 to pivot in the clockwise direction through 90° so that the pawl 37 jumps over the pawl engagement projection 39 located at the club output port 5 and engages one end of the projection 39. The turn table 13 is rotated through 90° for each repetition of the above-described operation.

A turn table braking mechanism 43 is provided, as typically shown in FIG. 4, for ensuring the 90° turn of the turn table 13. The turn table braking mechanism 43 includes a braking drum 44 installed below a lower surface of the turn table 13, a braking belt 45 extended around a peripheral surface of the drum 44, and an air cylinder 46 for tightening or loosening the belt 45 to or from the drum 44.

When the turn table drive mechanism 16 rotates the turn table 13, the braking belt 45 is loosened so as to enable a free rotation of the turn table 13. When the turn table 13 is rotated through 90°, the braking air cylinder 46 is operated to tighten the belt 45 to the drum 44 so as to prevent the turn table 13 from rotating through an angle over 90° due to an inertial force.

A cylindrical skirt cover 47 is attached onto the turn table supporting body 12 so as to enclose each cut out portion 26*a* of the circular buckets 26, 26, ---. One side of the skirt cover 47 is provided with a cut out portion 48. One of the club introducing inlet 14 of the club housings 15, ---, 15 is, located on the cut out portion 48.

It is noted that the operations of the turn table drive mechanism 16 and turn table braking mechanism 43 are controlled by means of a control unit 1300 installed within the club cleaning and waxing equipment 6 (the control unit 1300 will be described later). When the golf clubs continuously transported at predetermined intervals from the cleaning and waxing equipment 6 have been contained in the club housings 15 by a predetermined number, e.g., one set, the turn table 13 is automatically rotated through 90° so that one of the other club housings 15 becomes located on the club output port 5.

Consequently, the club housing 15 receives the set of the golf clubs for another golf player.

Since the golf club stocking apparatus is constructed as described above, the cut out portion 48 of the skirt cover 47 is arranged at a side of the club cleaning and waxing equipment 6 so as to be aligned with a position of the club output port 5 and the club 1 is transferred from the output port 5. Therefore, each club 1 is sequentially housed within the club housing 15 via the cut out portion 48 of the skirt cover 47 and club introducing inlet 14.

In addition, when the predetermined number of golf clubs are housed, the turn table 13 turns through 90° and the club introducing inlet 14 is placed on the cut out portion 48 and the club output port 5 so that each golf club is sequentially housed in the corresponding club housing 15. In this way, four golf club housings 15, ---, 15 receive the predetermined numbers of golf clubs. Therefore, one cycle of operations is completed.

Figure 17:
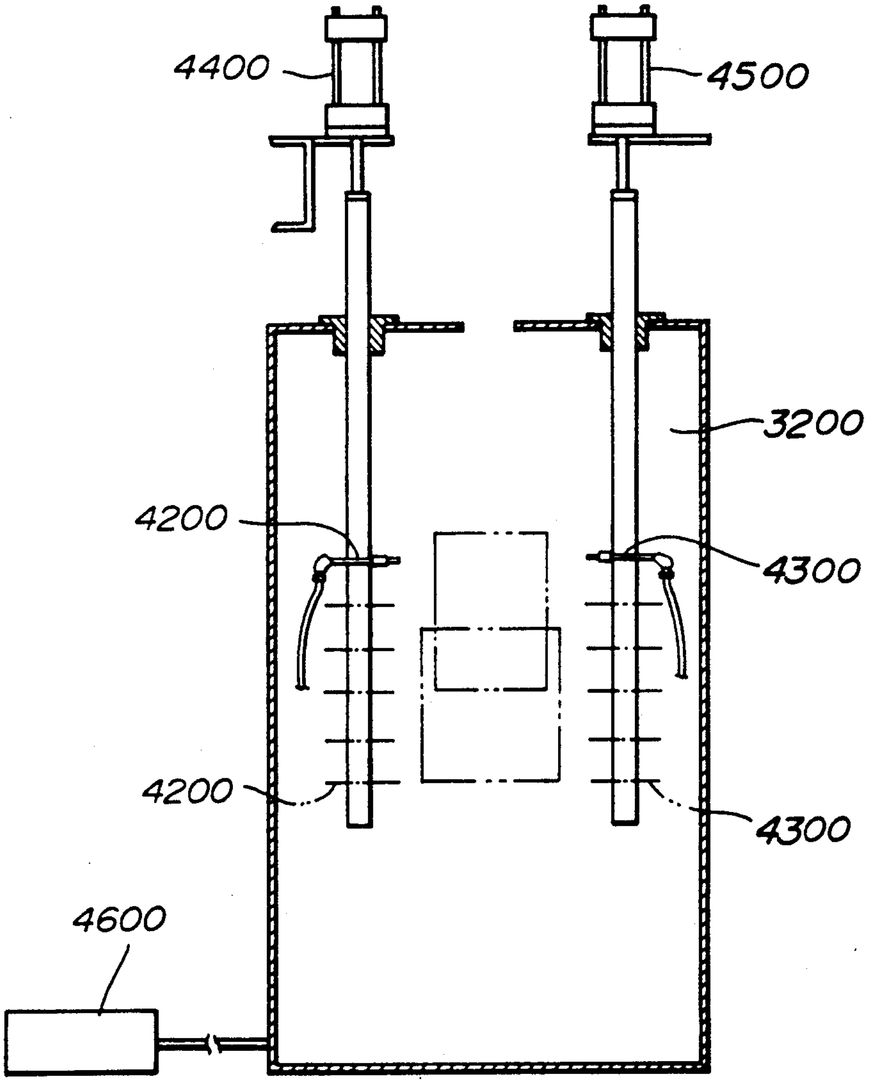
FIG. 17 is a sectional view of a blow chamber in the golf club cleaning and waxing equipment shown in FIG. 9.

In the preferred embodiment, the reason that the air cylinders are used in the turn table drive mechanism 16 and the turn table braking mechanism 43 is as follows; that is to say, an air compressor, as denoted by 4600 shown in FIG. 17, provided for the golf club cleaning and waxing equipment 6 is effectively utilized to supply a compressed air which sprays detergent (cleaner, or cleaning agent) or blows out water droplets after cleaning, thus constituting the turn table drive mechanism 16.

Hence, it is not always necessary to use the air cylinder for the turn table drive mechanism 16. A motor may be used to rotate the turn table 13 through each predetermined angle.

In addition, although the four golf club housings 15, ---, 15 are installed on the turn table 13, the number of the housings may be three or two according to the number of golf players.

Furthermore, the golf club housings may be removably attached to the turn table 13 so that the golf club housings 15, ---, 15 may be removed from the turn table 13 to carry the housings toward a desired position. Consequently, the golf clubs can conveniently be carried into a golf bag.

FIGS. 9 to 22 show an internal structure and operation of the golf club cleaning and waxing equipment 6.

Figure 9:
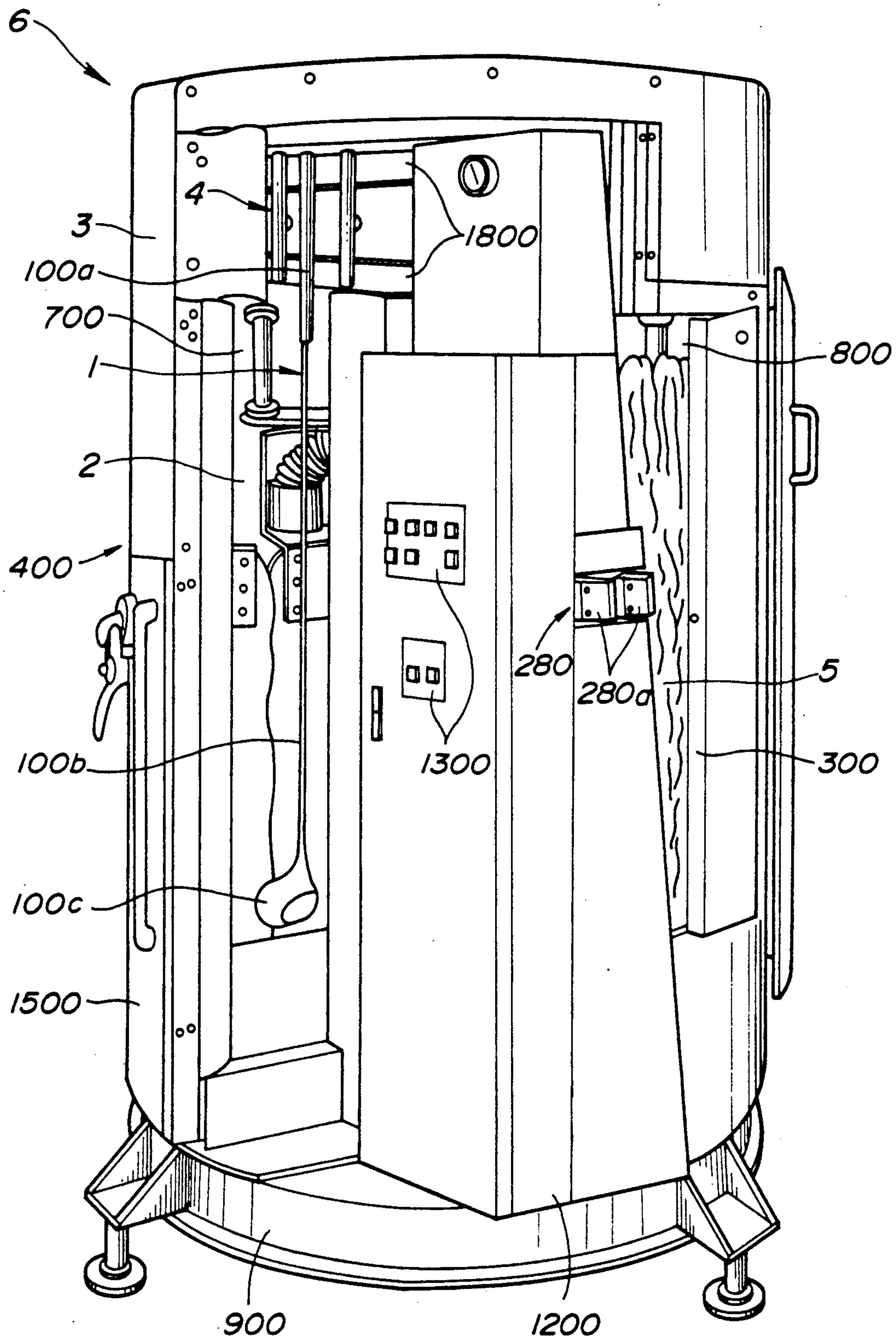
FIG. 9 is a perspective view of a golf club cleaning and waxing equipment to which the present invention is applicable.

In FIG. 9, the golf club cleaning and waxing equipment generally denoted by 6 includes the golf club inserting inlet 2, a housing 400 in which the golf club outlet 5, a golf club transport mechanism 4 which transports each golf club 1 inserted through the inlet 2 toward the outlet 5 along a peripheral surface of the housing 400, a golf club cleaning portion 700, disposed between the golf club inserting inlet 2 and golf club outlet 5, for automatically cleaning the golf clubs 1 transported by means of the golf club transport mechanism 4, and a golf club waxing portion 800 for waxing each golf club cleaned in the cleaning portion 700.

When each golf club which has become dirty due to a field play is inserted through the golf club inserting inlet 2, the golf club 1 is first transported to the golf club cleaning portion 700 to wash the corresponding golf club, thereafter, is transported to the golf club waxing portion 800 to be polished with wax, and transported to the golf club outlet 300.

Figure 10A:
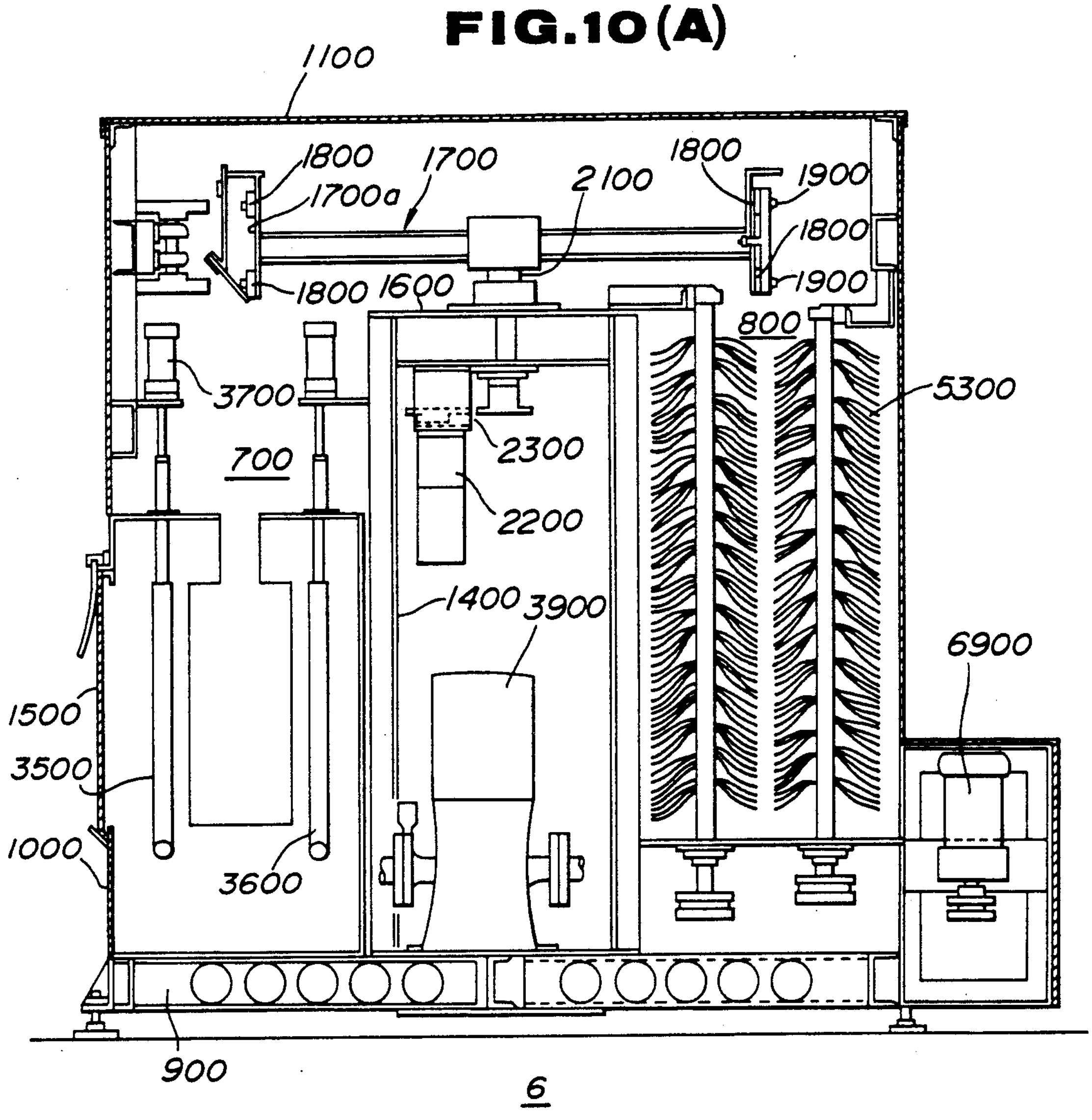
FIG. 10 (A) is a longitudinal sectional view of the golf club waxing equipment shown in FIG. 9.
Figure 10B:
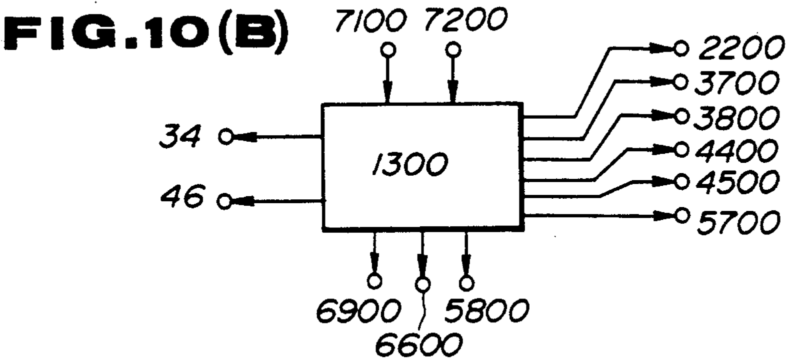

The housing 400, as shown in FIGS. 9 and 10, includes a circular base plate 900, a sector peripheral wall plate 1000 extended above the circular base plate 900, a circular ceiling plate 1100 attached to an upper end of the peripheral wall plate 1000, the peripheral wall plate 1000 and circular ceiling plate 1100 forming a cylindrically shaped wall of the housing having a diameter of about 180 cm and a height of about 150 cm, and the golf club inserting inlet 2 and outlet 300 installed longitudinally on both ends of the sector peripheral wall plate 100. A partitioning wall 1200 is attached between the club inserting inlet 2 and golf club outlet 300. A control portion 1300 is installed on the partitioning wall 1200 for controlling operations of the golf club transport mechanism 4, golf club cleaning portion 700, and club waxing portion 800.

Figure 2:
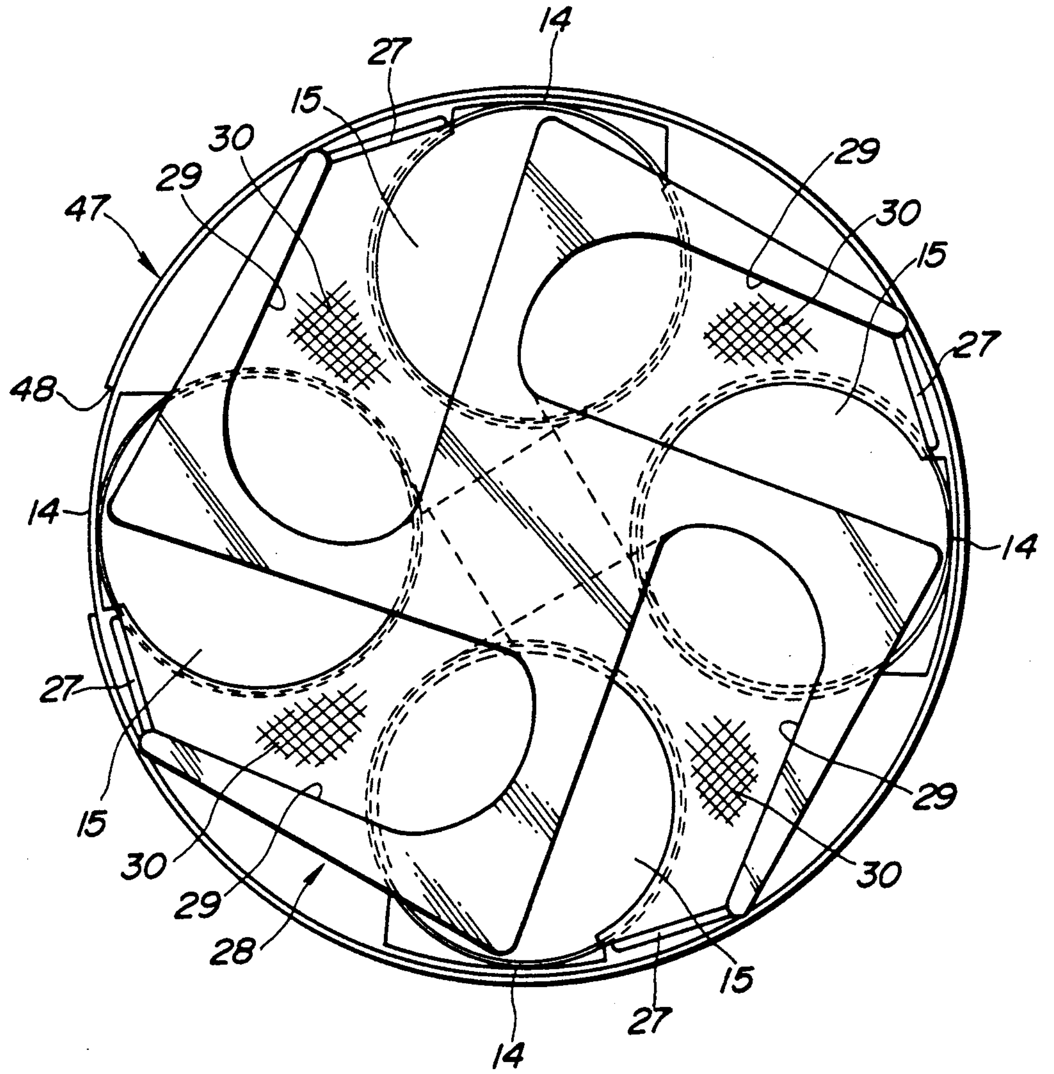
FIG. 2 is a plan view of the golf club stocking apparatus shown in FIG. 1.
Figure 3:
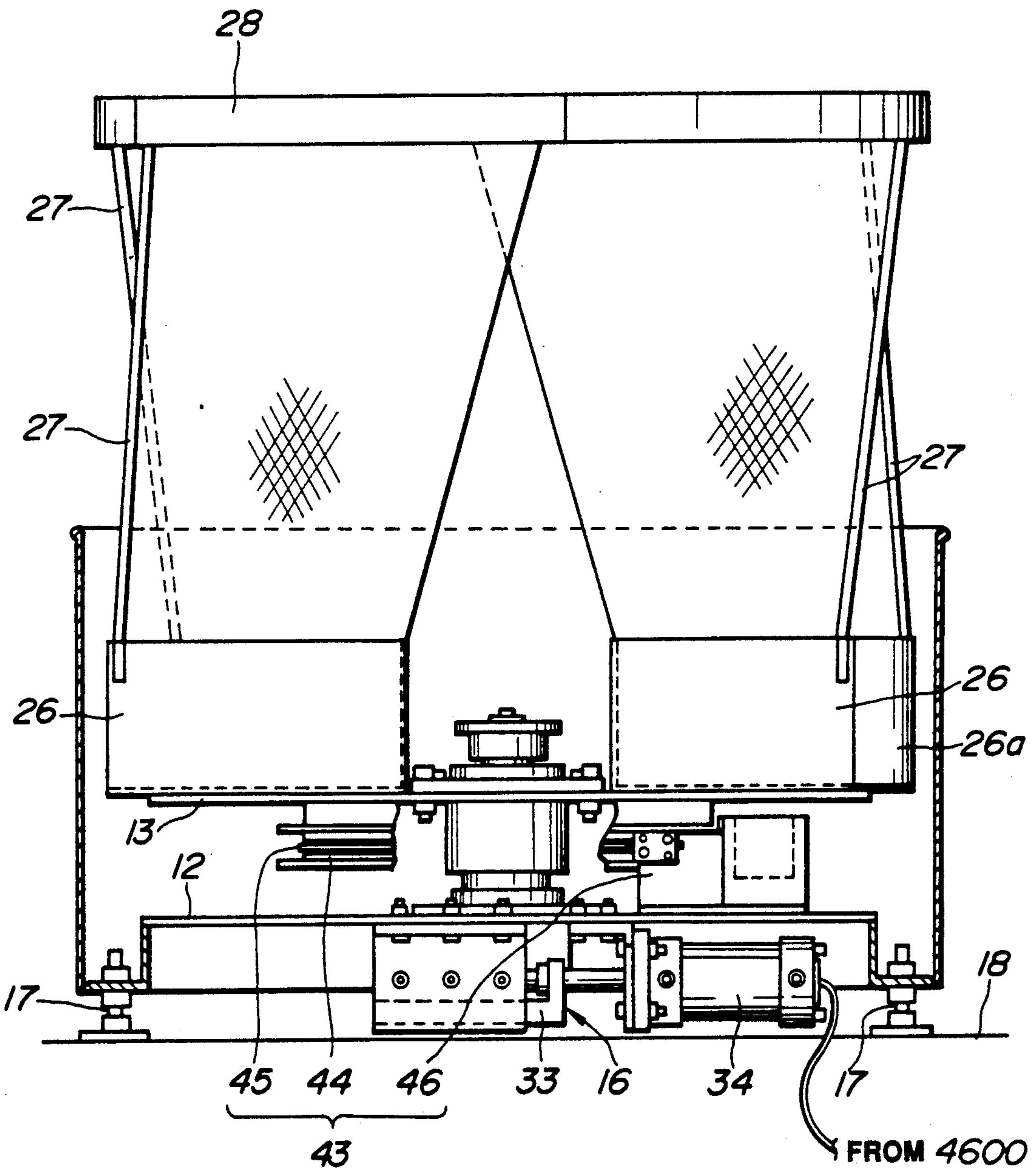
FIG 3 is a side view of the golf club stocking apparatus with a skirt cover being cut way.

On a central portion of the circular base plate 900, a cylindrical inner frame portion 1400 is installed as shown in FIGS. 2 and 3. An outer periphery of the inner frame portion 1400 is provided with the golf club cleaning portion 700 and a door 1500 which is communicated with the golf club cleaning portion 700. The golf club waxing portion 800 is provided on the outer periphery of the inner frame portion 1400.

A circular rotating body 1700 is attached onto an upper plate 1600 of the above-described inner frame plate 1600 which constitutes the golf club transport mechanism 4.

Figure 11:
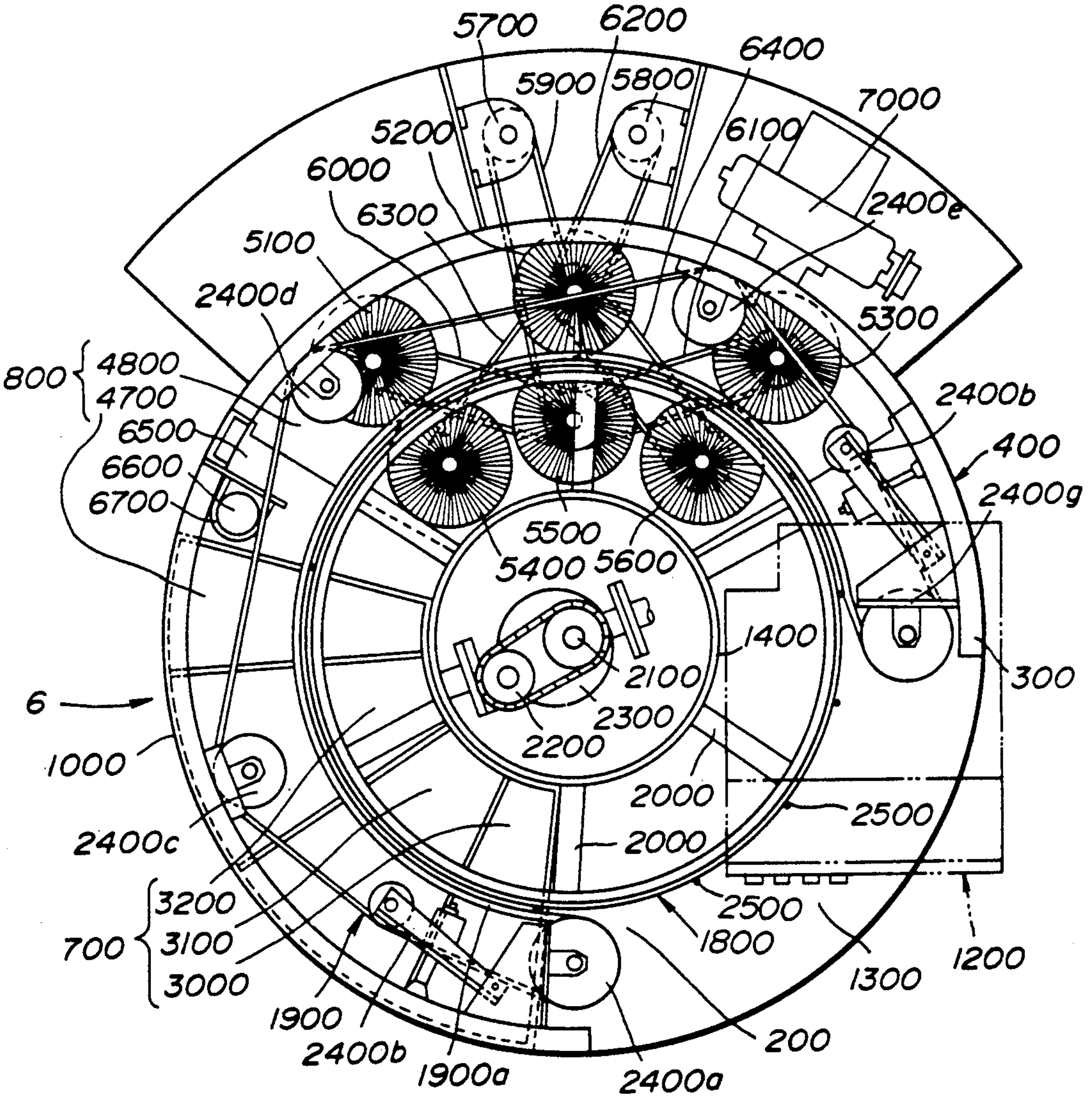
FIG. 11 is a lateral sectional view of the golf club waxing equipment shown in FIG. 9.

The transport mechanism 4, as shown in FIGS. 10 and 11, includes the circular rotating body 700 which is rotatably supported in the horizontal direction on the upper plate 1600 of the inner frame body 1400, a pair of upper and lower grip holding belts 1800, 1800 installed on a peripheral surface of the circular rotating body 1700 for holding grips of the golf clubs 1, and a pair of upper and lower endless belts 1900, 1900 which follow the rotation of the circular rotating body 1700 with a grip portion 100*a* of each golf club being attached between the grip holding belts 1800, 1800 under pressure.

The circular rotating body 1700 is formed in a wheel shape with spoke portions 2000, 2000. Its center portion of the rotating body 1700 is rotatably mounted on the upper plate 1600 of the inner frame body 1400 by means of a vertical axle 2100. Both motor 2200 installed within the inner frame body 1400 and rotation transmission mechanism 2300 drive the circular rotating body 1700 to rotate. A part of a peripheral surface 1700*a* of the circular rotating body 1700 is exposed to an upper part of the golf club inserting inlet 2 of the housing 400, as shown in FIG. 9.

The pair of upper and lower grip holding belts 1800, 1800 are attached onto upper and lower ends of the peripheral surface 1700*a* of the circular rotating body 1700. Each grip 100*a* of the golf clubs 1 is grasped between the pair of upper and lower endless belts 1900, 1900 as will be described later.

The pair of upper and lower endless belts 1900, 1900 are suspended in a substantially arc form by means of pulleys 2400*b*, 2400*c*, 2400*d*, 2400*e*, 2400*f*, 2400*g* disposed on a pair of upper and lower pulleys 2400*a* installed on an upper part of the golf club inserting inlet 2 in the clockwise direction sequentially from the pair of the upper and lower pulleys 2400*a*. Inner peripheral sides 1900*a*, 1900*a* of endless belts 1900, 1900 are opposed to the grip holding belts 1800, 1800 so that the grip 100*a* can be sandwiched between these grip holding belts 1800, 1800.

Figure 12:
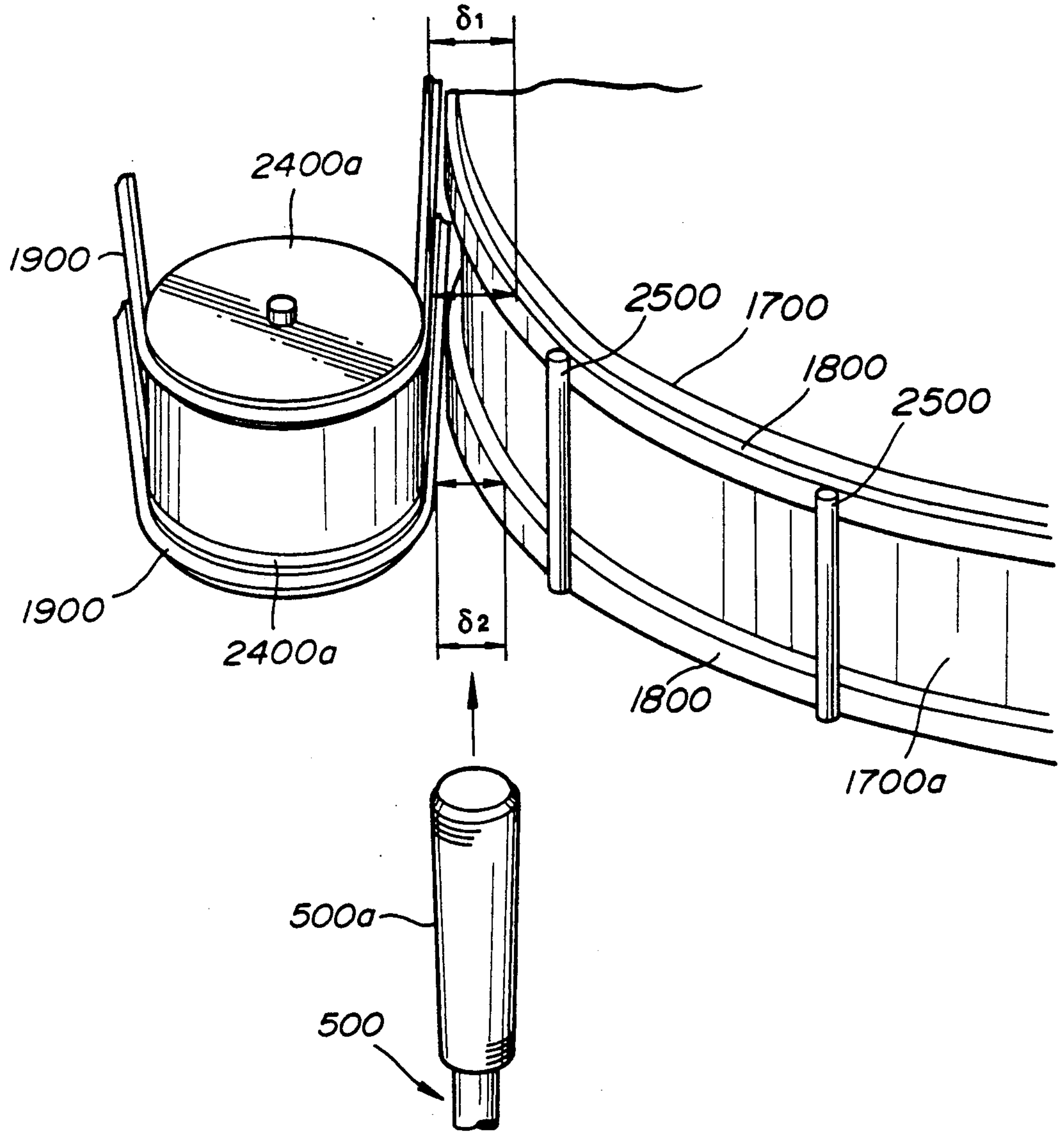
FIG. 12 is a perspective view of a transport mechanism of the golf club cleaning and waxing equipment shown in FIG. 9.

To increase a grasping effect of the golf club grip 100*a* between the endless belts 1900, 1900 and grip holding belts 1800, 1800, the endless belts 1900, 1900 and grip holding belts 1800, 1800, 1900, and 1900 are made of materials such as rubbers, and/or plastics. As shown in FIG. 12, to meet with a reverse truncated cone shape of the golf club grip 100*a* (the upper end of the grip 100*a* has a larger diameter than that of the lower end of the grip 100*a*) a gap denoted by $\delta_1$ provided between the upper grip holding belt 1800 and corresponding endless belt 1900 is wider than a gap denoted by $\delta_2$ provided between the lower grip holding belt 1800 and endless belt 1900. Consequently, the assured grasping of the grip 100*a* can be achieved. Blocking rods 2500, 2500 are installed along the peripheral surface 1700*a* of the circular rotating body 1700. These blocking rods 2500, ---, 2500 are longitudinally extended with predetermined spaces apart from each other in the peripheral direction of the peripheral surface 1700*a*. The grip 100*a* of the golf club 1 is located between the adjacent blocking rods 2500, 2500. It is noted that pulleys 2400*b* and 2400*f* serve as tension pulleys which provides which provides a desired tension for endless belts 1900, 1900.

Since the golf club transport mechanism 4 in the preferred embodiment is constructed as described above, the golf club 1 is inserted through the golf club inserting inlet 2 under such a state where the circular rotating body 1700 is rotated in the clockwise direction. The grip 100*a* of the golf club 1 is pressed against the space provided between the blocking rods 2500, 2500 on the peripheral surface 1700*a* of the circular rotating body 1700. Thereafter, the grip 100*a* is moved to a position at which the endless belts 1900, 1900 are placed together with the rotation of the circular rotating body 1700. The golf club 1 is transported by means of the rotation of the circular rotating body 1700 into the golf club cleaning portion 700 of the housing 4 in a state where the grip 100*a* is grasped by means of the endless belts 1900, 1900 and grip holding belts 1800, 1800 and thereafter is transported into the golf club waxing portion 800.

Figure 13:
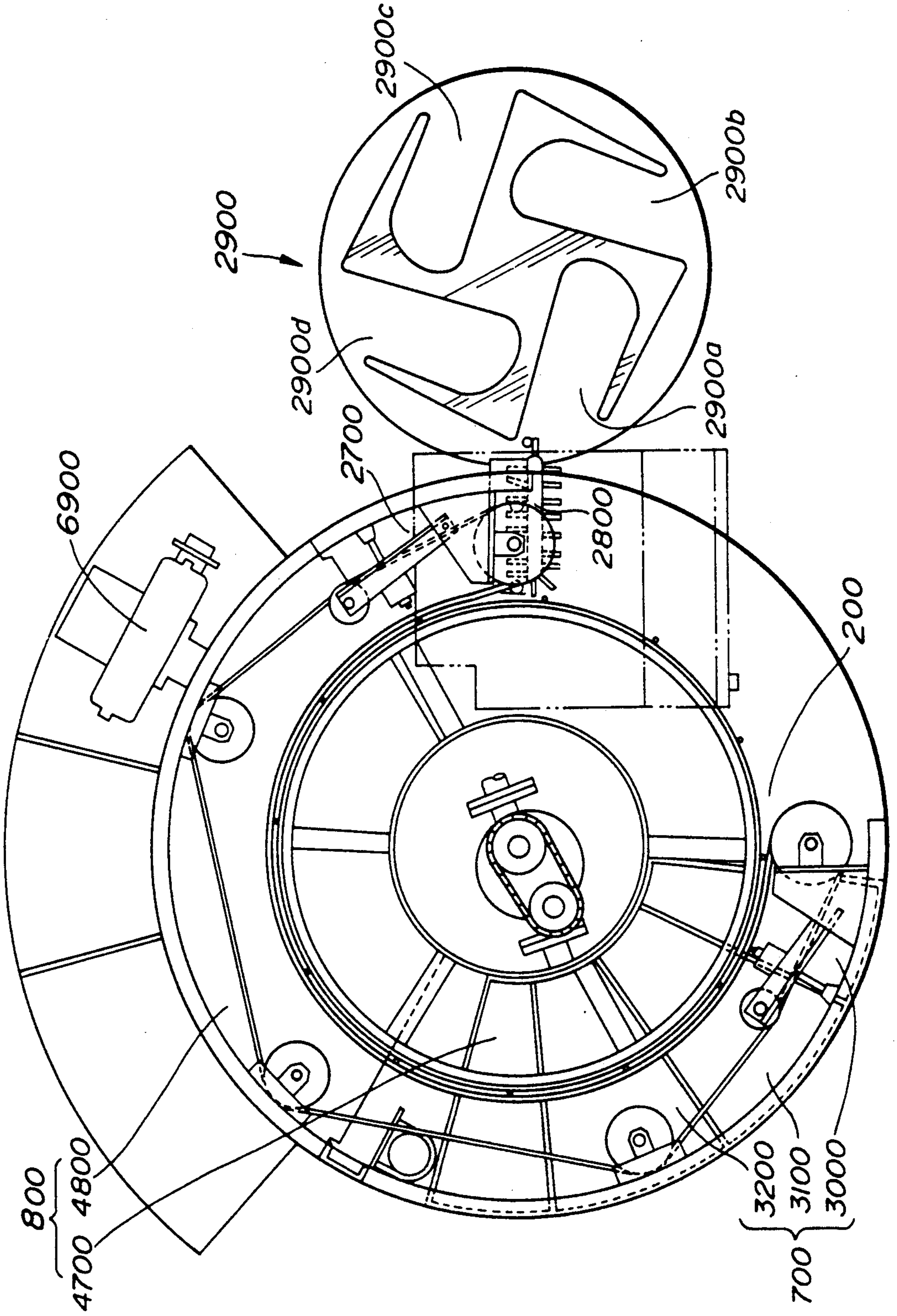
FIG. 13 is a plan view of the transport mechanism, first and second conveyers, and golf club container in the golf club cleaning and waxing equipment shown in FIG. 9.
Figure 14:
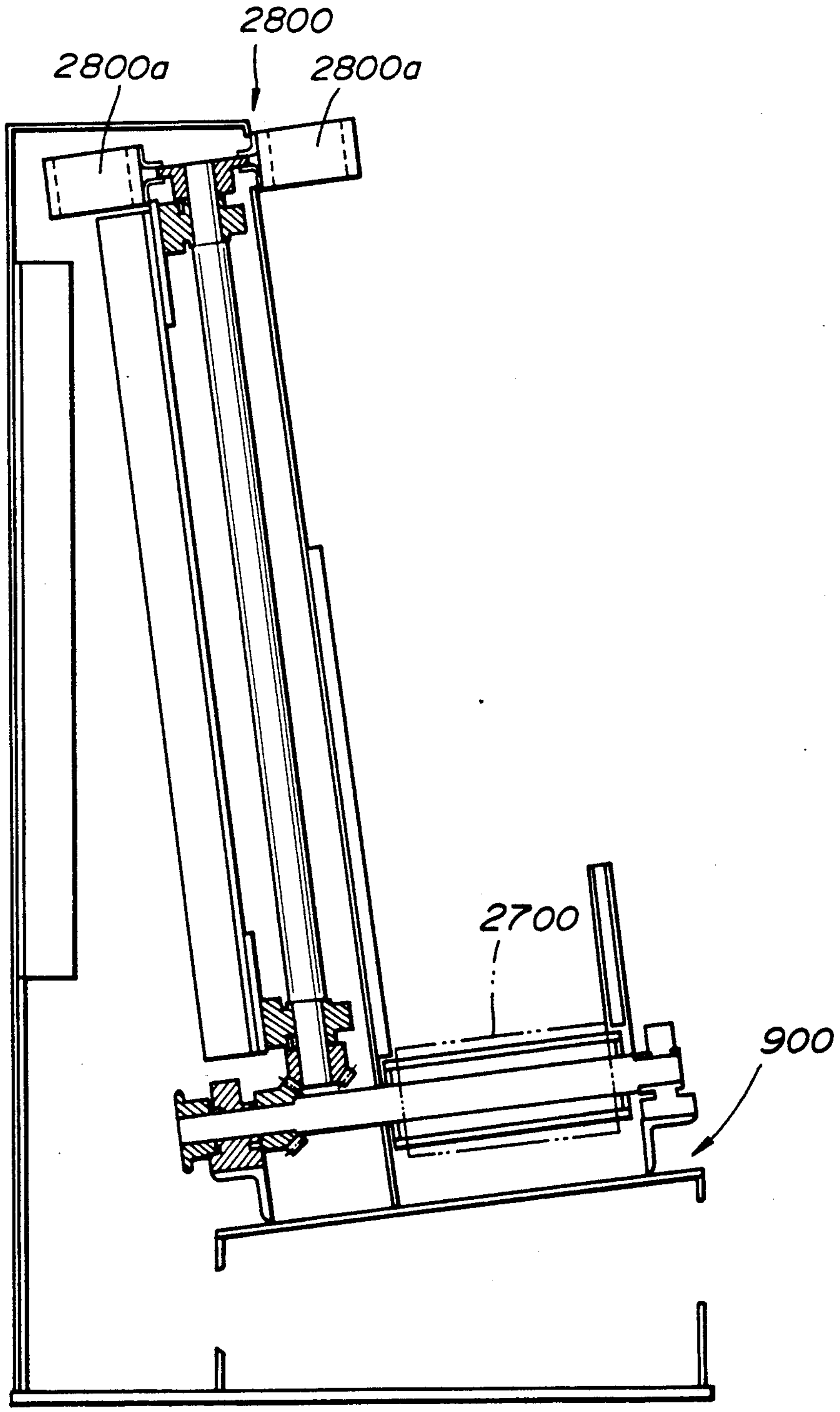
FIG. 14 is a sectional view of the first and second conveyers in the golf club cleaning and waxing equipment shown in FIG. 9.

Then, the golf club 1 is outputted from the club waxing portion 800 with the club polished with wax. The grip 100*a* of the golf club 1 outputted from the golf club waxing portion 800 is released from the endless belts 1900, 1900 and grip holding belts 1800, 1800 at a position in the vicinity to the golf club outlet 300. The golf club 1 which has been released from the grasp of the grip 100*a* by means of the grip holding and endless belts 1800, 1800, 1900, and 1900, as shown in FIGS. 13 and 14, is, in turn, transported to the golf club output port (outlet 300) by means of a first conveyer 2700 installed on the circular base plate 900 and a second conveyer 2800 installed on the partitioning wall body 1200. Then, the golf club 1 is supplied into the golf club stocking apparatus generally denoted by 2900. It is noted that the structure of the golf club stocking apparatus 2900 shown in FIG. 13 is shown in FIGS. 1 to 8.

The first conveyer 2700 is formed on a position on which the head 100*c* dropped substantially vertically lies, the grip 100*a* being released from the grasping by means of the endless belts 1900, 1900 and grip holding belts 1800, 1800. The first conveyer 2700 runs toward the golf club outlet 300.

The second conveyer 2800 is provided with a multiple number of elastic wing pieces 2800*a*, 2800*a*, ---, the upper end of a shaft 100*b* being grasped from a side end between these elastic wing pieces 2800*a*, 2800*a* and being travelled toward the golf club outlet 300.

In FIG. 13, numerals 2900*a* through 2900*d* denote four containing portions which correspond to numerals 15, ---, 15 shown in FIGS. 1 to 6.

FIGS. 13, 15 to 17 show the structure of the golf club cleaning portion 700.

Figure 15:
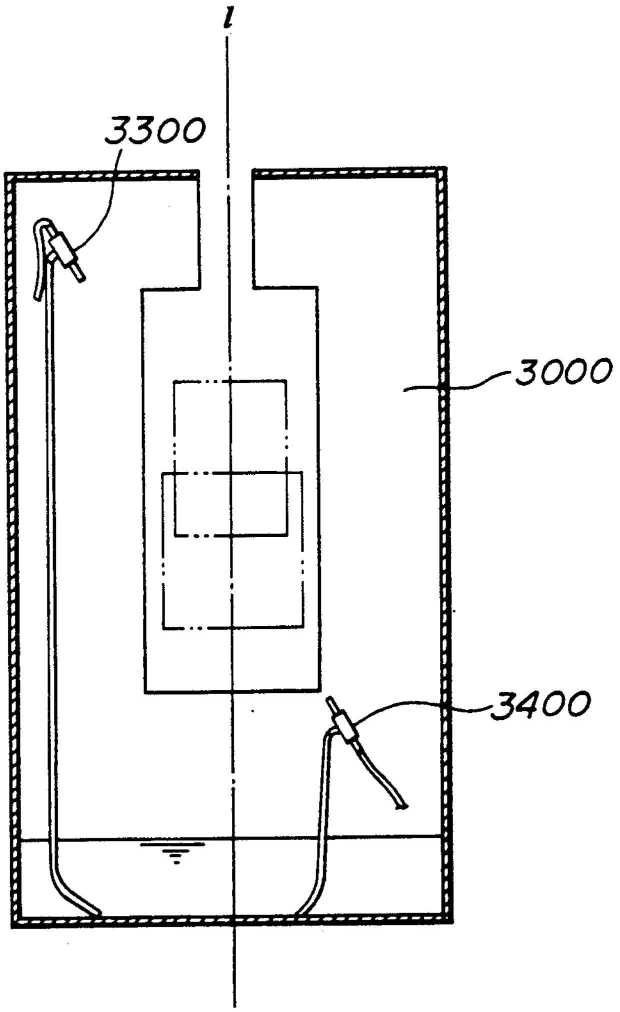
FIG. 15 is a sectional view of a cleaning agent spraying chamber in the golf cleaning and waxing equipment shown in FIG. 9.
Figure 16:
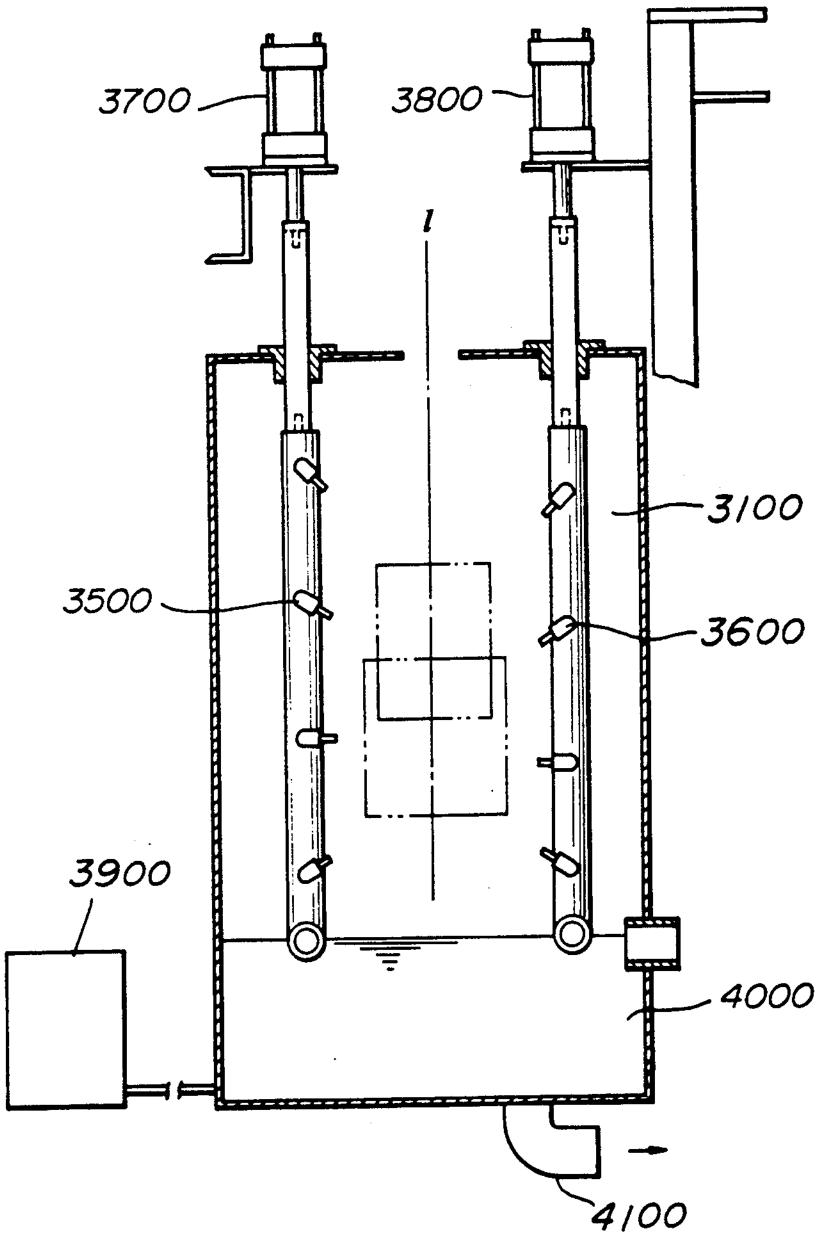
FIG. 16 is a sectional view of a water cleaning chamber of the golf club cleaning and waxing equipment shown in FIG. 9.

As shown in FIG. 15, the golf club cleaning portion 700 is divided into a cleaning agent spraying chamber 3000, a washing portion 3100, and blow chamber 3200 in an order from a part near to the golf club inserting inlet 2.

A pair of upper and lower spraying nozzles for the washing agent 33, 34 are installed at both sides of the cleaning agent spraying chamber 3000 with a travelling line l of the golf clubs as a center. The cleaning agent is sprayed toward the head 100*c* and shaft 100*b* of each golf club 1 through the upper and lower nozzles 3300, 3400.

A plurality of pairs of outer and inner water spraying nozzles 35, 35, ---, 36, ---, 36 are mounted on both sides of the water washing chamber 3100 with the travelling line l as a center so as to enable upward and downward movements by means of air (pneumatic) cylinders 3700, 3800. With the nozzles 3500, 3600 moved up-and-down so as to adjust the direction of sprayed water in accordance with the length of the golf club 1 by means of the air cylinders 3700, 3800. A large amount of water is sprayed energetically toward the golf club 1 passing through the line faced with the nozzles to clean off the cleaning agent adhered onto the surface of the club. Numeral 3900 denotes a pump for driving the water spray nozzles 3500, 3600. Numeral 4000 denotes a water bath installed below the lower part of the water washing chamber 3100. A part of water of the water bath 4000 is exhausted toward an external part outside of the housing 400 through an exhaust pipe 4100.

A plurality of pair of left and right compressed air spraying nozzles 4200, ---, 4200, 4300 --- 4300, are equipped into the blow chamber 3200 so as to be moved in the upward and downward directions by means of the air cylinders 4400, 4500, as shown in FIG. 17.

The nozzles 4200, 4300 are moved in the upward and downward directions so as to meet with the length of the golf club 1. During the movement of the nozzles 4200, 4300, the compressed air is injected energetically toward the golf club 1 passing between these nozzles. Thus, water droplets adhered onto the surface of the golf club 1 are blown off during the cleaning. An air compressor 4600 is provided for spraying the cleaning agent through the cleaning agent injection nozzles 3300, 3400.

In addition, the air compressor 4600 serves to drive the air cylinders 3700, 3800, 4400, 4500.

In the golf club cleaning portion 700, the golf club 1 supplied into the cleaning agent spraying chamber 3000 by means of the golf club transport mechanism 4 receives the spray of the cleaning agent, is washed with sprayed water, and is blown with the compressed air. Then, the golf club 1 in a completely dried state is supplied into the golf club waxing portion 800 as will be described later. The golf club cleaning portion 700 may receive a supersonic wave, immersed into a cleaning liquid in the water bath.

The golf club waxing portion 800 is divided into the golf club wax blasting chamber 4700 and buff chamber 4800 in an order from a part nearer to the golf club inserting inlet 2.

Figure 18:
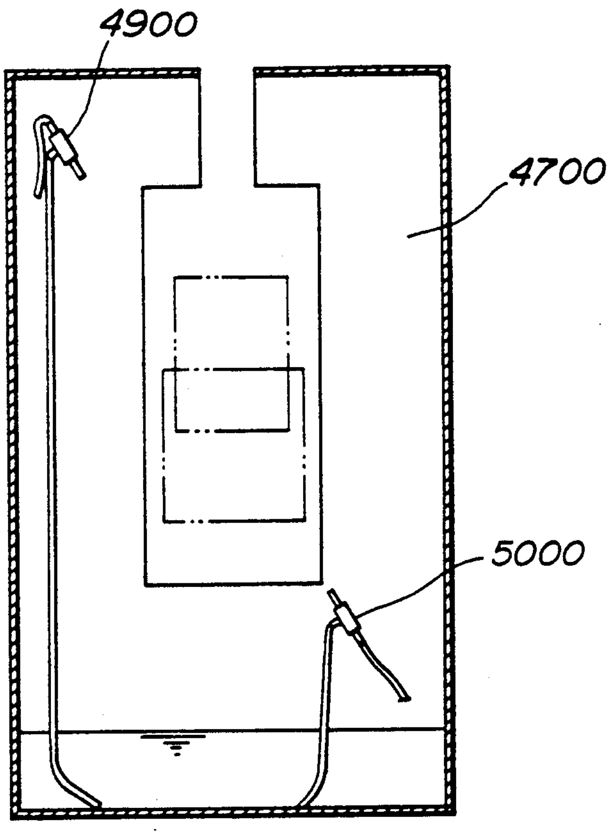
FIG. 18 is a sectional view of a wax spraying chamber in the golf club cleaning and waxing equipment shown in FIG. 9.

A pair of upper and lower wax spraying nozzles 4900, 5000 are installed as shown in FIG. 18. A waxing agent is sprayed toward the head 100*c* and shaft 100*b* of the golf club 1.

The buff chamber 4800 has first, second, and third rotating brushes 5100, 5200, 5300 at outer sides of the travelling line of the golf club 1 and fourth, fifth, sixth rotating brushes 5400, 5500, 5600 at inner sides of the travelling line. Each golf club 1 passing through the travelling line between the first through third rotating brushes 5100 through 5300 and between the fourth through sixth rotating brushes 5400 through 5600 is brushed from both left and right ends.

As shown in FIG. 11, first rotating brush 5100 and fourth rotating brush 5400, second rotating brush 5200 and fifth rotating brush 5500, and third and sixth rotating brush 5600 constitute the pairs of the rotating brushes. It is noted that the first, third, and fifth rotating brushes 5100, 5300, and 5500 and second, fourth, and sixth rotating brushes 5200, 5400, 5600 are rotatable in their opposite directions to increase a brushing effect. Numerals 5700 5800 denote electric motors for driving the brush rotations. The rotation of one electric motor 5700 is transmitted to a fifth rotating drum 5500 via a first rotating transmission belt 5900. Furthermore, the rotation of the motor 5700 is transmitted to the first and third rotating brushes 5100, 5300 via the fifth rotating drum 5500 and second and third rotating transmission belts 6000, 6100. In addition, the rotation of the other motor 5800 is transmitted to the second rotation brush 5200 via the fourth and sixth rotating transmission belts 6200 and is transmitted to the fourth and sixth rotating brushes 5400, 5600 via the second rotating drum 5200.

When the golf club 1, from the surface of which the water droplets are removed in the blow chamber 3200, the wax agent is sprayed on the surface of the club 1 in the waxing chamber 4700 and polished with the rotating brushes 5100 through 5600 in the buff chamber 4800.

The grip portion 100*a* of the golf club 1 supplied from the buff chamber 400 is released from the grasped state by means of the endless belts 1900, 1900 and grip holding belts 1800, 1800 in the vicinity to the golf club outlet 300. These first and second conveyers 2700, 2800 installed in the vicinity to these belts 1800, 1800, 1900, 1900 cause the golf club 1 to appear at the golf club outlet 300.

Figure 19:
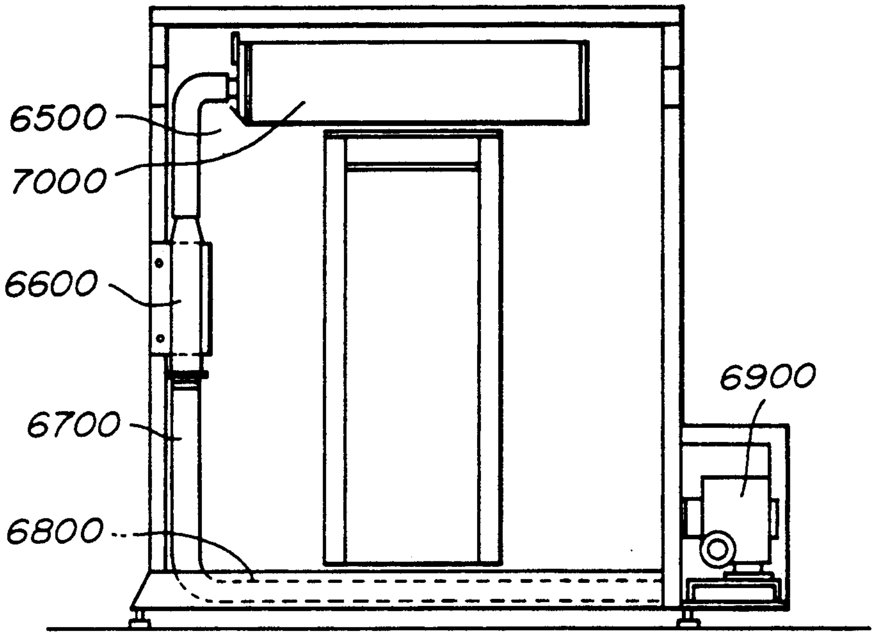
FIG. 19 is a longitudinal cross sectional view of a space portion for drying each golf club in the golf club cleaning and waxing equipment shown in FIG. 9.
Figure 20:
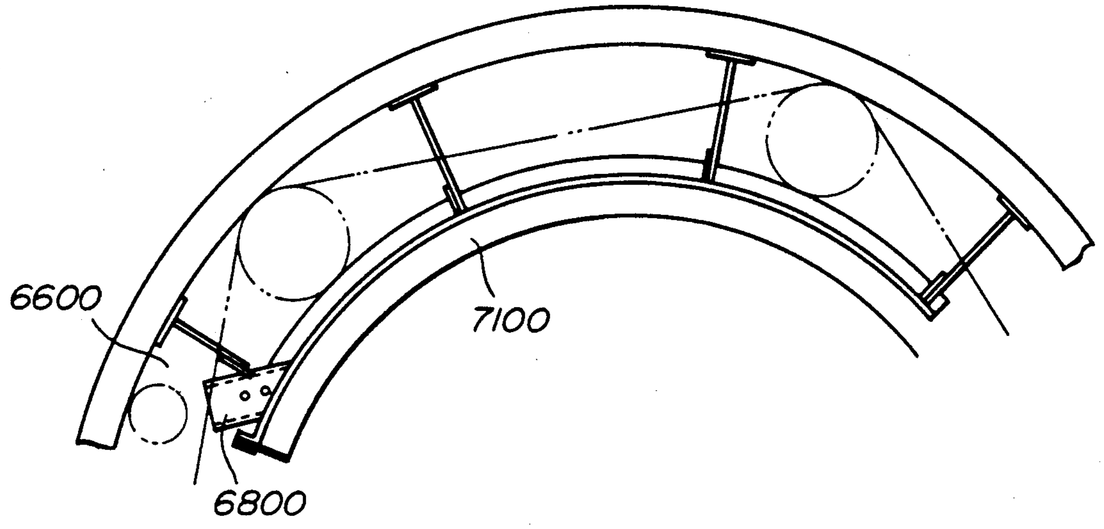
FIG. 20 is a lateral sectional view of the space portion for drying the grip portion of each golf club in the golf club cleaning and waxing equipment shown in FIG. 9.

In FIG. 19, numeral 6500 denotes a space for drying the grip which is provided between the wax spraying chamber 4700 and buff chamber 4800. A heat-resistant duct 6700 is installed in the space 6500 in which a heater 6600 is installed. An upper end of the duct 6700 is opened at the grip holding belts 1800, 1800 and endless belts 1900, 1900 and the other end thereof is connected to a blower 6900 via a ventilation duct 6800. A wind produced by a blower 6800 becomes warm after heated by means of the heater 6600. The warm wind is blown out from the heat-resistant duct 6700 toward the grip holding belts 1800, 1800 and endless belts 1900, 1900. The grip 100*a* of the golf club 1 is dried which has been grasped by means of the holding and endless belts 1800, 1800, 1900, and 1900. A guide duct 7000 is connected to the upper end of the heat-resistant duct 6700. Through the guide duct 7000, the warm wind is flowing along the golf club grip holding belts 1800, 1800 and endless belts 1900, 1900.

Figure 21:
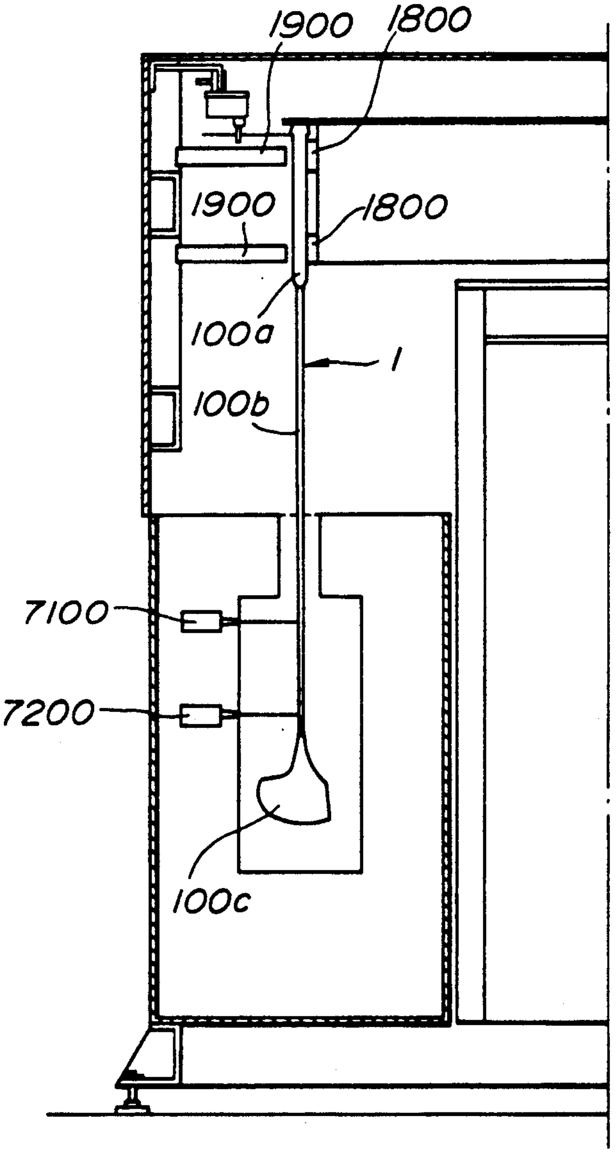
FIG. 21 is a longitudinal sectional view of a golf club inserting inlet in the golf club cleaning and waxing equipment.

In FIG. 21, numerals 7100, 7200 denote a pair of upper and lower photo sensors 7100, 7200 installed in the vicinity to the golf club inserting inlet 2. The length of the golf club 1 inserted by means of the photo sensors 7100, 7200 is detected so that the control portion 1300 determines whether the golf club 1 passing through a detection region of the pair of photo sensors is an iron club or wood club on the basis of the detection result. The wax agent spraying is carried out according to the determined kind of the golf club 1.

As described above, when one of the golf clubs 1 which has become dirty is inserted through the golf club inserting inlet 2 and thereafter the grip 100*a* is grasped between the holding belts 1800, 1800 and endless belts 1900, 1900, the golf club 1 is first supplied into the golf club cleaning portion 700 so that the cleaning agent is sprayed toward the golf club 1, water is sprayed to wash the surface of the golf club in the washing chamber 3100, and water droplets are removed from the shaft 100*c* and head portions 100*b* in the blow chamber 3200. Next, the golf club 1 is supplied to the golf club waxing portion 800. The wax agent is sprayed onto the surface of the golf club 1 in the wax spraying portion 4700. The golf club 1 is, then, supplied into the buff chamber 4800 and is brushed, while the grip 100*a* is dried with the warm wind supplied by means of the air blower 6900 and heater 6600. Then, the golf club 1 in the dry state is supplied from the golf club waxing portion 800.

When the grasping of the golf club 1 by means of the grip holding belts 1800, 1800 and endless belts 1900, 1900 is released at the position in the vicinity to the golf club outlet 300, the golf club 1 released from the grasping is transported into one of the containers 2900*a* in the golf club stocking apparatus by means of first conveyer 2700 installed on the circular base plate 900 and second conveyer 2800 installed on the partitioning body 1200. When one set of the golf clubs is supplied into the container 2900*a*, the golf club stocking apparatus 11 (2900) is rotated through 90 degrees. The other containers 2900*b*, 2900*c*, and 2900*d* receive one set of the golf clubs, respectively. Consequently, a series of operations is ended.

Figure 22:
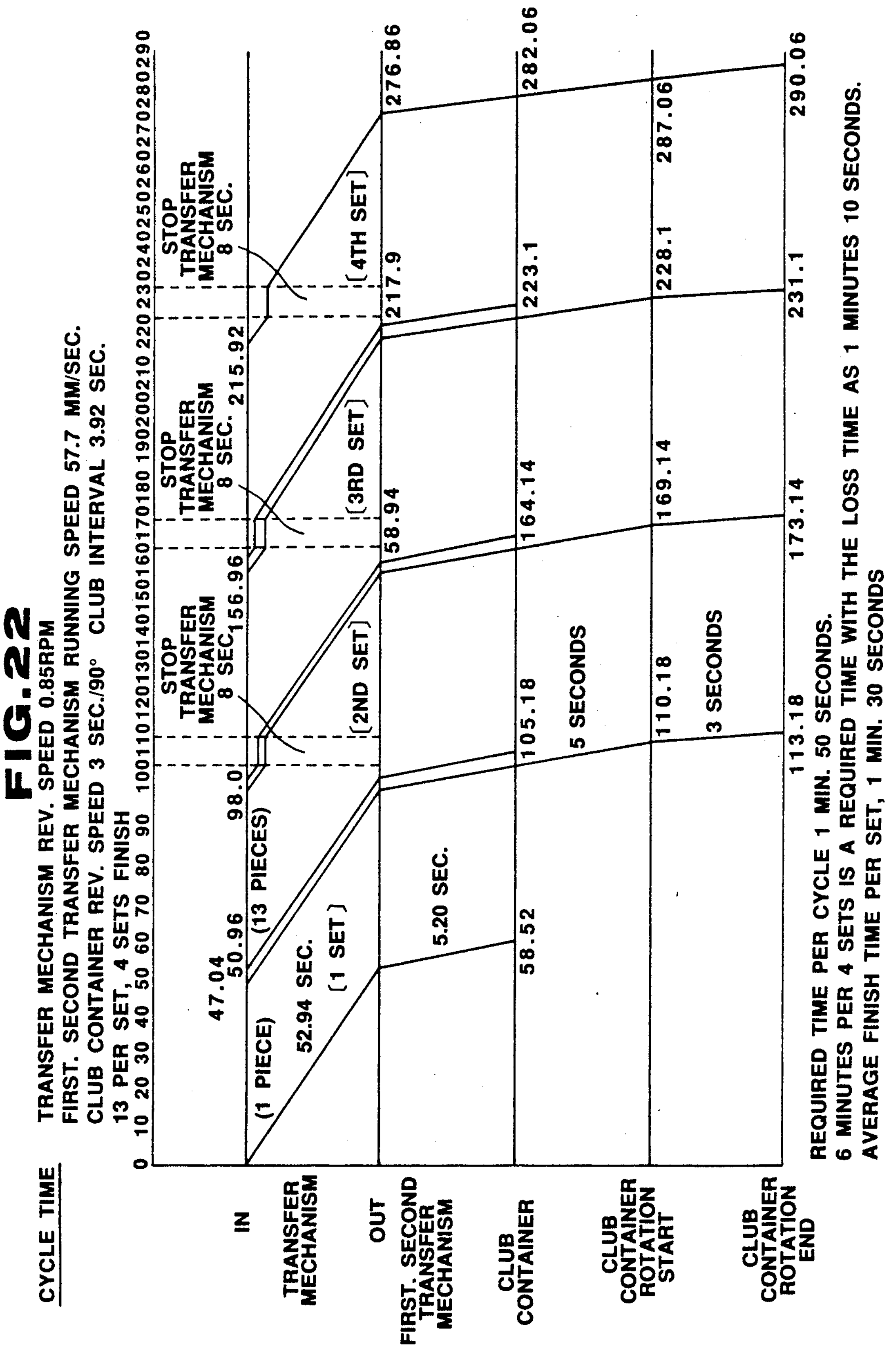
FIG. 22 is a timing chart for explaining operation of each part of the golf club cleaning and waxing equipment shown in FIG. 9.

FIG. 22 shows the timing chart indicating the process and working time for the respective operations of the golf club cleaning and waxing equipment 6 and golf club stocking apparatus 11.

It is noted that cables for connecting a power supply to the control unit 1300, for connecting the control unit 1300 to air cylinders installed in the golf cleaning and waxing equipment 6 and golf club stocking apparatus 11, for connecting the control unit 1300 to each photo sensor 7100, 7200, and so on are shown in FIG. 10 (B).

As described hereinabove, since the golf club stocking apparatus according to the present invention is constructed in the way described above, the turn table drive mechanism rotates the turn table through the predetermined angle so that the club introducing inlet of each club housing is placed on the club output port of the club cleaning and waxing equipment. Therefore, each golf club cleaned, waxed, and transported from the output port of the equipment can temporarily housed in the corresponding golf club housing. Consequently, if the golf clubs are continuously inserted into the club inserting inlet at the position of the club inserting inlet of the golf club cleaning and waxing equipment, the golf clubs cleaned and waxed are sequentially and automatically housed and stocked in each corresponding club housing.

Hence, since no manual handling of the cleaned and waxed golf clubs is needed at the club output port of the equipment, the handling of the golf clubs becomes easy.

It will fully be appreciated by those skilled in the art that the foregoing description is made in terms of the preferred embodiment and various changes and modification can be made without departing from the present invention which is to be defined by the appended claims.

What is claimed is:

1. An apparatus for cleaning, waxing and stocking a plurality of golf clubs, comprising:

(a) an apparatus floor;

(b) a turn table supporting member which is substantially of a disc shaped metal located above said floor of the apparatus via legs;

(c) a turn table rotatably supported on the turn table supporting member;

(d) means for cleaning and waxing golf clubs wherein said means has a club output port, a golf club transport mechanism, a golf club cleaning portion, a golf club waxing portion, and a grip drying portion;

(e) a plurality of golf club housings removably attached onto the turn table, each having a club introducing inlet in radial directions of the turn table with equal angles of intervals with respect to the turn table for housing respective golf clubs delivered from the club output port of the golf club cleaning and waxing means;

(f) a turn table drive mechanism for turning the turn table so that any one of the golf club introducing inlets is communicated with the club output port of the club cleaning and waxing means to receive one of the golf clubs delivered through the output port; and (g) means for delivering the cleaned and waxed golf clubs from the output port to the club introducing inlet of said housing.

2. An apparatus as set forth in claim 1, wherein the turn table is substantially of a disc shaped metal supported by the turn table supporting member via a supporting axle and supporting axle bearing.

3. An apparatus as set forth in claim 2, wherein the turn table drive mechanism includes a pinion fixed to a lower end of the turn table supporting axle, a rack meshed with the pinion, an air cylinder for slidably actuating the rack, a pawl supporting plate fixed to an upper end of the supporting axle, a pawl rotation fixed to the pawl supporting plate via a pawl axle, and a plurality of pawl engagement projections extended from the supporting axle bearing.

4. An apparatus as set forth in claim 3, wherein the pawl engagement projections are formed on a flange integrally formed on the supporting axle bearing so as to oppose positions of the golf club housings and one end of the respective pawl engagement projections can be brought in close contact with the pawl.

5. An apparatus as set forth in claim 4, the turn table drive mechanism turns the turn table via the pawl and one of the pawl engagement projections through a predetermined angle so that the corresponding club introducing inlet is communicated with the club output port.

6. An apparatus as set forth in claim 5, wherein the number of the club housings is four and the angle of turn through which the turn table mechanism turns is substantially 90 degrees.

7. An apparatus as set forth in claim 4 wherein the air in the air cylinder is delivered from an air compressor installed for the golf club cleaning and waxing equipment to wash the golf club with a cleaning agent.

8. An apparatus as set forth in claim 5, which further includes a turn table braking mechanism for braking the turn table which is being rotated through the predetermined angle.

9. An apparatus as set forth in claim 8, wherein the turn table braking apparatus includes a braking drum installed on a lower surface of the turn table, a braking belt extended around a periphery of the drum, and another air cylinder for tightening the belt to the drum or for loosening the tightened belt.

10. An apparatus as set forth in claim 9, wherein the belt is loosened when the turn table drive mechanism actuates the turn table to rotate through the predetermined angle and is tightened when the turn table has been rotated through the predetermined angle.

11. An apparatus as set forth in claim 9, wherein the golf club housings includes the plurality of circular buckets disposed on the turn table with intervals between the respective buckets of the predetermined angles, a plurality of ceiling supporting poles inclined from the periphery of the turn table with equal intervals, a ceiling of a hooked cross shape supported on an upper portion of the circular buckets, and nets extended from an inner peripheral edge of each recess of the ceiling to a peripheral edge of the circular buckets.

12. An apparatus as set forth in claim 11, which further includes a cylindrical skirt cover attached to the turn table supporting member so as to enclose cut out portions of the circular buckets and provided with a cut out portion at one end thereof, one club introducing inlet of the club housings being positioned at the cut out portion of the skirt cover.

13. An apparatus as set forth in claim 12, wherein both turn table drive mechanism and turn table braking mechanism are controlled by means of a control unit installed in the club cleaning and waxing equipment.

14. An apparatus as set forth in claim 1, wherein the golf club cleaning and waxing means includes:

(a) an equipment housing having a golf club inserting inlet and the golf club output port;

(b) a golf club transport mechanism for transporting the golf club inserted into the equipment housing through the golf club inserting inlet toward the output port, the golf club transporting mechanism grasping and transporting the golf club;

(c) a golf club cleaning portion installed within the equipment housing and between the golf club inserting inlet and output port for automatically cleaning shaft and head portions of the golf club transported on the golf club transport mechanism;

(d) a golf club waxing portion installed adjacent to the golf club cleaning portion for automatically waxing the shaft and head portions of the golf club cleaned by the golf club cleaning portion; and (e) a grip drying portion for automatically drying a grip portion of the golf club waxed by the golf club waxing portion, after passing through the grip drying portion, the golf club appearing on the golf club output port.

15. An apparatus as set forth in claim 14, wherein the equipment housing is formed in a substantially cylindrical shape and is provided with the golf club inserting inlet and output port which are placed at positions of a peripheral surface of the equipment housing mutually adjacent to each other.

16. An apparatus as set forth in claim 14, wherein the golf club transport mechanism includes a plurality of circular rotating bodies which are installed on an upper part of the equipment housing and rotatable in a horizontal direction, a first belt, installed on a peripheral surface of the respective circular rotating bodies, for gripping the grip portion of the golf club, and a second belt, with the grip portion of the golf club being grasped together with the first belt, which follows the rotation of the respective rotating bodies.

17. An apparatus as set forth in claim 14, wherein the golf club cleaning portion includes a cleaning agent spraying chamber for spraying the cleaning agent toward the golf club, a water cleaning chamber for spraying water onto the golf club on which the cleaning agent is, sprayed to wash the golf club, and a blow chamber for removing water droplets adhered onto the surface of the golf club after the golf club has passed through the water cleaning chamber.

18. An apparatus as set forth in claim 17, wherein the golf club waxing portion includes a wax spraying chamber for spraying a wax agent onto the golf club dried in the blow chamber and a buff chamber for polishing the golf club on which the wax agent is sprayed.

19. An apparatus as set forth in claim 18, wherein the grip drying portion includes a blower, a ventilation duct having one end on which the blower is installed and the other end opened toward the grip portion of the golf club during the transport of the golf club by means of the transport mechanism, and a heater installed in the ventilation duct.

20. An apparatus as set forth in claim 19, which further includes a control unit for controlling operations of the golf club transport mechanism and golf club cleaning, waxing, and drying portions.

21. An apparatus as set forth in claim 20, wherein the control unit controls the operation of the turn table driving mechanism of the golf club stocking apparatus.

22. An apparatus as set forth in claim 21, which further includes a pair of photo sensors for detecting a length of the golf club inserted through the golf club inserting inlet and wherein the control unit determines whether the golf club is an iron club or wood cub so that a waxing agent is sprayed toward the shaft and head portions of the golf club according to a kind of the golf club detected by means of the pair of photo sensors.

* * * * *